US012566075B2

(12) United States Patent
Ha et al.

(10) Patent No.: US 12,566,075 B2
(45) Date of Patent: Mar. 3, 2026

(54) METHOD, DEVICE AND SYSTEM FOR GUIDING USERS IN MOBILITY TRANSIT HUBS

(71) Applicants: Hyundai Motor Company, Seoul (KR); Kia Corporation, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 358 days.

(21) Appl. No.: 17/847,645

(22) Filed: Jun. 23, 2022

(65) Prior Publication Data
US 2023/0045272 A1 Feb. 9, 2023

(30) Foreign Application Priority Data
Aug. 3, 2021 (KR) ........................ 10-2021-0102023

(51) Int. Cl.
| | |
|---|---|
| *G01C 21/34* | (2006.01) |
| *G06Q 10/02* | (2012.01) |
| *G06Q 10/0631* | (2023.01) |
| *G06Q 50/40* | (2024.01) |
| *G07C 9/15* | (2020.01) |

(52) U.S. Cl.
CPC ..... *G01C 21/3492* (2013.01); *G01C 21/3423* (2013.01); *G01C 21/3438* (2013.01); *G06Q 10/02* (2013.01); *G06Q 10/06315* (2013.01); *G06Q 50/40* (2024.01); *G07C 9/15* (2020.01)

(58) Field of Classification Search
CPC ............ G01C 21/3492; G01C 21/3423; G01C 21/3438; G06Q 10/02; G06Q 10/06315; G06Q 50/40; G07C 9/15
See application file for complete search history.

(56) References Cited

U.S. PATENT DOCUMENTS

| | | | | |
|---|---|---|---|---|
| 12,060,092 | B2 * | 8/2024 | Alarcon ................. | A63G 31/00 |
| 2008/0267107 | A1 * | 10/2008 | Rosenberg ............. | H04H 20/61 |
| | | | | 370/312 |
| 2015/0336013 | A1 * | 11/2015 | Stenzler ............... | G06V 10/245 |
| | | | | 700/90 |
| 2016/0180412 | A1 * | 6/2016 | DuLeone ........... | G06Q 30/0281 |
| | | | | 705/346 |
| 2020/0081418 | A1 * | 3/2020 | Dyne .................... | G06Q 10/04 |
| 2020/0385016 | A1 * | 12/2020 | Noguchi .......... | G08G 1/096811 |
| 2021/0062567 | A1 * | 3/2021 | Majdali ................. | A63G 31/00 |
| 2021/0102812 | A1 * | 4/2021 | Spielman ........... | G01C 21/3423 |
| 2021/0302174 | A1 * | 9/2021 | Abdulla ............. | G06Q 30/0645 |

(Continued)

*Primary Examiner* — Kavita Stanley
(74) *Attorney, Agent, or Firm* — MCDONNELL BOEHNEN HULBERT & BERGHOFF LLP

(57) ABSTRACT

Disclosed herein a method, device and system for guiding users in a mobility transit hub therefor. The method includes: obtaining user information that comprises at least one of route information of the user using the mobility transit hub and mobility use information associated with a mobility requested by the user; analyzing, based on the user information, movement demand of the user who moves to an affiliated zone connected with the transit hub; and controlling an operation of a guide apparatus that controls a passage of the user, in order to lead the user to the affiliated zone that is determined based on the movement demand.

18 Claims, 13 Drawing Sheets

(56) References Cited

U.S. PATENT DOCUMENTS

| | | | | |
|---|---|---|---|---|
| 2022/0129014 A1* | 4/2022 | Ota | ........................... | G08G 5/32 |
| 2022/0135081 A1* | 5/2022 | Lee | ........................ | G06V 20/58 |
| | | | | 701/23 |
| 2022/0164911 A1* | 5/2022 | Stumpf | ................. | H04W 4/024 |

* cited by examiner

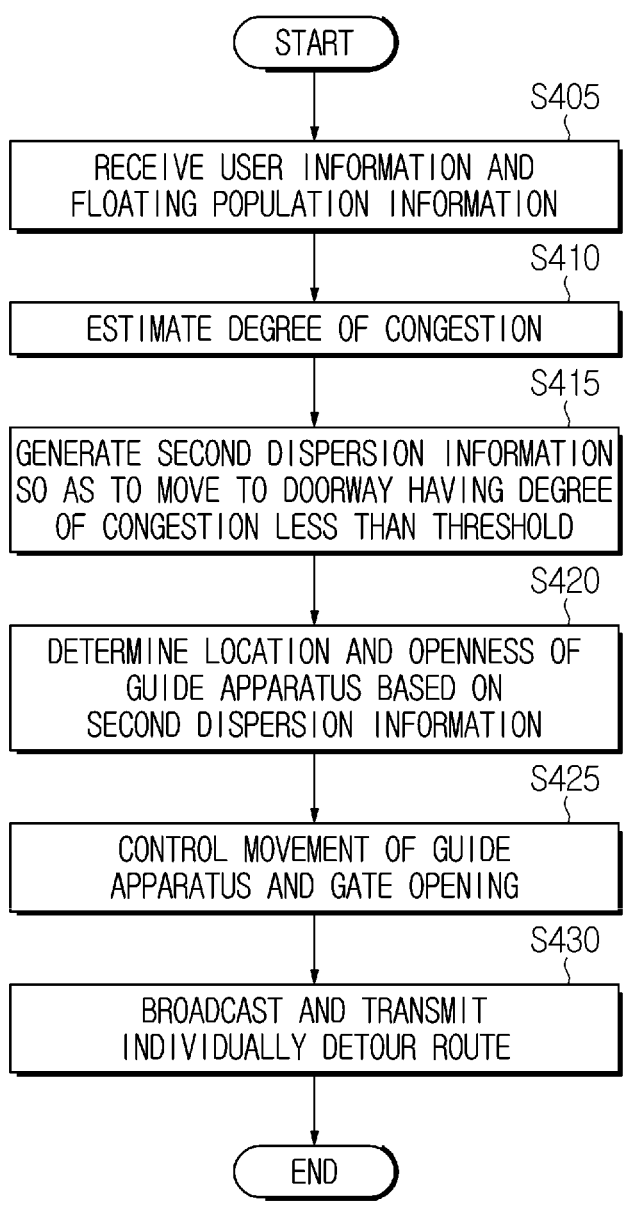

S405

RECEIVE USER INFORMATION AND
FLOATING POPULATION INFORMATION

S410

ESTIMATE DEGREE OF CONGESTION

S415

GENERATE SECOND DISPERSION INFORMATION
SO AS TO MOVE TO DOORWAY HAVING DEGREE
OF CONGESTION LESS THAN THRESHOLD

S420

DETERMINE LOCATION AND OPENNESS OF
GUIDE APPARATUS BASED ON
SECOND DISPERSION INFORMATION

S425

CONTROL MOVEMENT OF GUIDE
APPARATUS AND GATE OPENING

S430

BROADCAST AND TRANSMIT
INDIVIDUALLY DETOUR ROUTE

FIG. 11

METHOD, DEVICE AND SYSTEM FOR GUIDING USERS IN MOBILITY TRANSIT HUBS

CROSS-REFERENCE TO RELATED APPLICATIONS

The present application claims priority to a Korean patent application 10-2021-0102023, filed Aug. 3, 2021, the entire contents of which are incorporated herein for all purposes by this reference.

TECHNICAL FIELD

The present disclosure relates to a method, device and system for guiding users in a mobility transit hub. Particularly, the present disclosure relates to a method, device and system for guiding users in a mobility transit hub, which enhance transit convenience and reduce congestion of the transit hub in a management system implemented by a computing device.

BACKGROUND

Along with technical advances, the notion of car ownership is being weakened, while the use of shared mobilities is on the rise. Specifically, for the convenience of everyday life in a particular region or residence, the needs for shared mobilities and related services are increasing. For the smooth use of shared mobilities in an area crowded with users, many shared mobilities may be kept and managed near the crowded area.

In addition, a transportation demander may arrive at a destination not by walk but by mixing a means of public transportation and a shared mobility. A regular route bus, a subway, an autonomous driving moving object, a bus rapid transit (BRT), an urban air mobility (UAM), a personal aerial vehicle (PAV) and the like may be provided as means of public transportation, and in order to enhance connectivity with a public transportation service, a shared mobility zone may be provided near a public transportation stop facility. Such a stop facility may function as a mobility transit hub in which a means of public transportation and a shared mobility may be used together. In order to enhance the convenience of a transportation demander, a transit hub is intended to hold as many means of public transportation as possible and various types of shared mobilities. Accordingly, as a mobility service zone also increases, a user may have difficulty in approaching the mobility service zone, which the user wants to use in a transit hub. In addition, a complex building visited by many people may be located near a transit hub in which various mobilities are connected. Accordingly, a large floating population including transportation demanders and neighboring visitors use a transit hub, thereby increasing a degree of congestion. Thus, a system is needed to enhance transit convenience and to reduce congestion in a transit hub.

SUMMARY

A technical object of the present disclosure is to provide a method, device and system for guiding users in a mobility transit hub, which enhance transit convenience and reduce congestion of the transit hub in a management system implemented by a computing device.

The technical objects of the present disclosure are not limited to the above-mentioned technical objects, and other technical objects that are not mentioned will be clearly understood by those skilled in the art through the following descriptions.

According to the present disclosure, there is provided a method for guiding a user in a mobility transit hub implemented by a computing device, the method comprising: obtaining user information that comprises at least one of route information of the user using the mobility transit hub and mobility use information associated with a mobility requested by the user; analyzing, based on the user information, movement demand of the user who moves to an affiliated zone connected with the transit hub; and controlling an operation of a guide apparatus that controls the user's passage, in order to lead the user to the affiliated zone that is determined based on the movement demand. According to the embodiment of the present disclosure in the method, the affiliated zone may comprise a mobility transit zone, which is provided around the transit hub, and a surrounding facility zone.

According to the embodiment of the present disclosure in the method, the mobility transit zone may comprise at least one of a shared mobility zone, a regular route moving object zone, and an on-demand shuttle zone.

According to the embodiment of the present disclosure in the method, the controlling of the operation of the guide apparatus may control the operation of the guide apparatus to the affiliated zone that corresponds to movement demand related to the use request, when the mobility use information comprises a use request for a transit mobility, which is made by the user device and the affiliated zone is a mobility transit zone.

According to the embodiment of the present disclosure in the method, the analyzing of the movement demand may search the transit mobility based on the information on the location point and analyze movement demand associated with the searched transit mobility, when the route information comprises information on a location point, which is reachable by using a transit mobility provided in the transit hub.

According to the embodiment of the present disclosure in the method, the controlling of the operation of the guide apparatus may control an operation of each of the guide apparatuses to guide the user to a plurality of affiliated zones that are determined based on the movement demand, when there is a plurality of the guide apparatuses.

According to the embodiment of the present disclosure in the method, the analyzing of the movement demand may analyze the movement demand by identifying a frequency of use of each zone, when the affiliated zone comprises a plurality of shared mobility zones of a same type. And the controlling of the operation of the guide apparatus may control the operation of the guide apparatus in order to lead first to the shared mobility zone having a high frequency of use.

According to the embodiment of the present disclosure in the method, the mobility use information further may comprise return information that requests to return the shared mobility to the transit hub. The method further may comprise generating the return information, which requests to return the shared mobility first to the shared mobility zone having the high frequency of use, and transmitting the return information to a user device.

According to the embodiment of the present disclosure in the method, when the affiliated zone comprises a plurality of shared mobility zones of a same type, the analyzing of the movement demand may comprise checking use status information of a shared mobility according to each zone, and generating first dispersion information for dispersing the user according to each shared mobility zone based on the use status information and the movement demand. The controlling of the operation of the guide apparatus may comprise controlling the operation of the guide apparatus based on the first dispersion information. And the use status information may be generated based on retention information of the shared mobility in the zone and reservation and return information of the shared mobility in the zone.

According to the embodiment of the present disclosure in the method, the mobility use information further may comprise return information that requests to return the shared mobility to the transit hub. The method further may comprise generating the return information, which requests to return the shared mobility first to the shared mobility zone based on the first dispersion information; and transmitting the return information to a user device.

According to the embodiment of the present disclosure in the method, the user information further may comprise history information that stores cumulatively data associated with a transit mobility that is already used in the transit hub. And the analyzing of the movement demand may analyze the movement demand for the affiliated zone associated with the transit mobility that is already used.

According to the embodiment of the present disclosure in the method, after the controlling of the operation of the guide apparatus, the method may further comprise generating information on a moving route entering the affiliated zone, which is designated according to the user information, via the guide apparatus and transmitting the information on the moving route to each user device, and broadcasting a location of the affiliated zone and a location of the guide apparatus, which corresponds to the affiliated zone, to the user.

According to the embodiment of the present disclosure in the method, the analyzing of the movement demand further may comprise estimating a degree of congestion of an entry point for the affiliated zone based on floating population information at the entry point of the transit hub for moving to the affiliated zone and the user information, and generating second dispersion information for dispersing the user to the entry point below a threshold based on the degree of congestion. The controlling of the operation of the guide apparatus may control the operation of the guide apparatus based on the second dispersion information. According to the embodiment of the present disclosure in the method, the controlling of the operation of the guide apparatus may control the guide apparatus so that entry points having different degrees of congestion have different numbers of users passing by based on the second dispersion information.

According to the embodiment of the present disclosure in the method, the mobility use information further may comprise riding information associated with a mobility used by the user. The analyzing of the movement demand further may comprise estimating a degree of congestion of the entry point for the affiliated zone based on the route information and the riding information, and generating third dispersion information for dispersing the user to the entry point below a threshold based on the degree of congestion.

The controlling of the operation of the guide apparatus may control the operation of the guide apparatus based on the third dispersion information.

According to the embodiment of the present disclosure in the method, the analyzing of the movement demand further may comprise estimating a degree of congestion of an entry point for the affiliated zone based on floating population information at the entry point of the transit hub for moving to the affiliated zone and the user information, and generating modified zone information associated with the entry point below the threshold based on the degree of congestion, when the transit mobility is capable of stopping at a zone modified from a pre-designated affiliated zone. The controlling of the operation of the guide apparatus may control the operation of the guide apparatus based on the modified zone information.

According to the embodiment of the present disclosure in the method, the guide apparatus may be configured to move along the affiliated zone in the transit hub, and control a number of users who move to the affiliated zone.

According to another embodiment of the present disclosure, there is provided a server for guiding a user in a mobility transit hub, the server comprising: a transceiver configured to transmit and receive a signal; and a processor configured to control the transceiver. The processor is further configured to: obtain user information that comprises at least one of route information of the user using the mobility transit hub and mobility use information associated with a mobility requested by the user, analyze, based on the user information, movement demand of the user who moves to an affiliated zone connected with the transit hub, and control an operation of a guide apparatus that controls the user's passage, in order to lead the user to the affiliated zone that is determined based on the movement demand.

According to another embodiment of the present disclosure, there is provided a management system implemented by a computing device and capable of executing a user guide process in a mobility transit hub, the management system comprising: a server configured to operate the management system; at least one user device registered to the management system; and at least one mobility registered to the management system. The server is configured to: obtain user information that comprises at least one of route information of a user using the mobility transit hub and mobility use information associated with a mobility requested by the user, analyze, based on the user information, movement demand of the user who moves to an affiliated zone connected with the transit hub, and control an operation of a guide apparatus that controls the user's passage, in order to lead the user to the affiliated zone that is determined based on the movement demand.

The features briefly summarized above for this disclosure are only exemplary aspects of the detailed description of the disclosure which follow, and are not intended to limit the scope of the disclosure.

According to the present disclosure, a method, device and system for guiding users in a mobility transit hub may be provided which enhance transit convenience and reduce congestion of the transit hub in a management system implemented by a computing device.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 11 is a flowchart showing a process of guiding users using transit control of a guide apparatus based on a degree of congestion.

DETAILED DESCRIPTION

Figure 1:
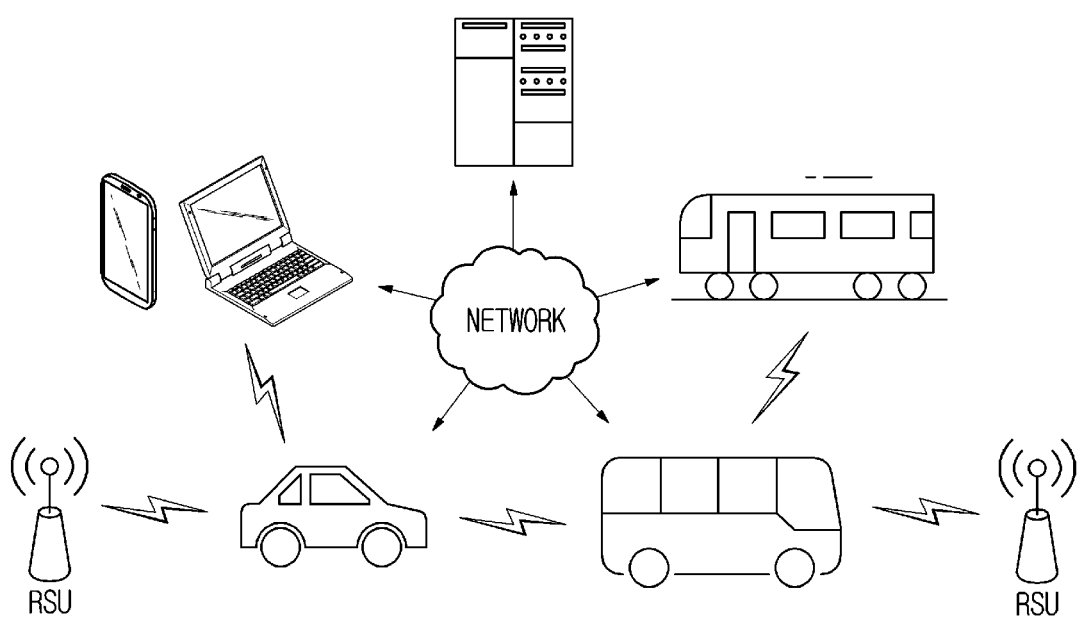
FIG. 1 is a view illustrating that a mobility and a user device communicates with another device via a network.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units.

Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the present disclosure to those skilled in the art.

Hereinafter, embodiments of the present disclosure will be described with reference to the accompanying drawings.

FIG. 1 is a view illustrating that a mobility and a user device communicates with another device via a network.

Referring to FIG. 1, a mobility may communicate with another mobility or another device. Mobility may refer to a device capable of moving as a mean to carry a user. For example, a mobility may be a regular route moving object, a shared mobility, an on-demand moving object, a flying moving object and the like. A regular route moving object may be a mobility that carries users along a route by way of designated stops. For example, a regular route moving object may be a regular route bus, a subway, a BRT and the like, which is not limited the above-described example. A shared mobility may be a moving object that is owned by an operating organization or a private person and is provided to be used by another user. For example, shared mobilities may be various types of vehicles and micro mobilities. A vehicle may be a sedan, an SUV, or a vehicle capable of loading cargoes. For example, "micro mobility" may include a micro mobility including at least three wheels for stable independent driving or a micro mobility (e.g., a single-wheeled segway, a two-wheeled segway, an electric scooter, etc.) that has one or two wheels but is capable of being driven independently by keeping its balance. A micro mobility may use electricity as a power source by means of a battery but is not limited thereto and may utilize any type of power sources capable of moving the mobility. As an example, a micro mobility may mean a means of transportation that may be taken or used by only one user. In addition, a micro mobility may mean a means of transportation that a small number of users may use as a small means of transportation. As an example, not only a single-wheeled segway, a two-wheeled segway and an electric scooter but also an electric wheelchair, an electric bicycle and an electric two-wheeled vehicle may be a micro mobility. In addition, a micro mobility may be any other moving device and is not limited to the above-described embodiment. An on-demand moving object may be a moving object carrying a user along a dynamic route that is generated according to multiple users' requests. An on-demand moving object may be a shuttle, which runs on a basic regular route within a certain region and is capable of changing the route within a limited range, or a moving object that moves with no restriction by setting dynamically a route within a certain region. A flying moving object may be a means of transportation flying in the air, taking off and landing at predetermined base points. For example, the flying moving object may be a personal aerial vehicle (PAV) or an urban air mobility (UAM). A flying moving object may fly along base points, which are already designated, or to a base point that is selected at a user's request. For example, a flying moving object may be a small aerial vehicle that is driven by a person or is an unmanned or autonomous driving drone, which is not limited to the above-described example.

Meanwhile, a mobility and a user device may communicate with another mobility or an external server based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a mobility, such as DSRC may be used, and the present disclosure is not limited to the above-described embodiment.

In addition, as an example, regarding communication of a mobility, for the security of the mobility, a module capable of communicating with a user device and a module capable of communicating with an external server may be separated from each other. As an example, a mobility may perform security-based communication like Bluetooth and NFC only with a device within a predetermined range from the mobility. As an example, the mobility and a personal device privately owned by a user may include a communication module for performing communication only with each other. That is, the mobility and the user' personal device may use a communication network disconnected from an external communication network. Also, as an example, the mobility may include a communication module for performing communication with an external server. In addition, as an example, the above-described module may be implemented as a single module. In other words, based on a single module, a mobility may communicate with another device, which is not limited to the above-described embodiment. That is, in a mobility, communication may be performed based on various methods and is not limited to the above-described embodiment.

A user device may communicate with an external server. For example, an external server may be a mobility management server for using a mobility, a route server for guiding a route to a destination, and a transit hub server for managing a mobility transit hub (Hereinafter, referred to as "transit hub"). A user device may be connected with an external server from a space separate from a transit hub or from a mobility during a ride. As another example, when entering a transit hub, a user device may exchange data as the connection with the transit hub is activated. In case a user device makes a use request for a mobility at a transit hub, the use request may be transmitted to a mobility management server and to a transit hub server at the same time. In case a route to a destination, which a user device requests to a route server, includes a transit hub, a route request of the user device may be transmitted to a transit hub server. In the above description, a mobility management server and a transit hub server are different devices, but in another example, a single server may be implemented to use a mobility and to manage a transit hub. For example, in case a transit hub provides a mobility service (e.g., a shared mobility service, an on-demand shuttle service and the like), a transit hub server may perform a transit-related service of the transit hub along with the provision, management and use of a mobility. In this case, when there is a use request of a mobility from a user device, the use request may be transmitted to a transit hub server.

Figure 2:
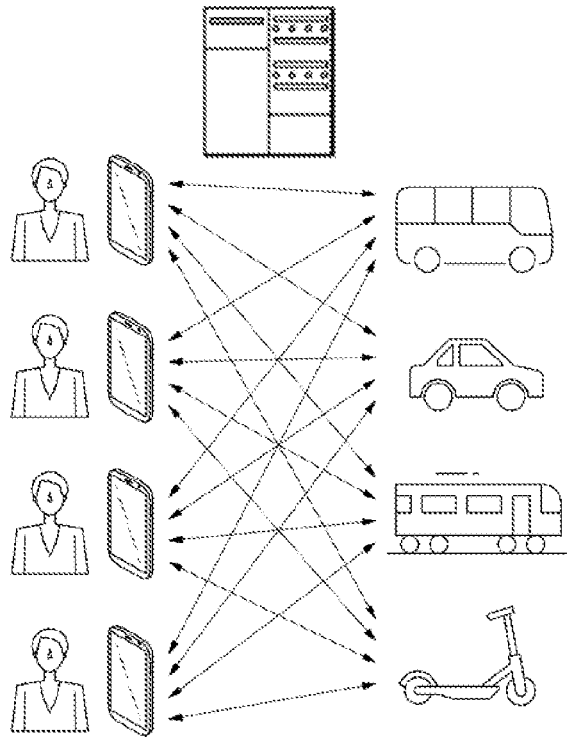
FIG. 2 is a view illustrating that a mobility is managed and controlled based on a management system.

FIG. 2 is a view illustrating that a mobility is managed and controlled based on a management system.

As an example, a management system may be applied in order to manage a mobility using a transit hub and to provide a transit service to a user. A management system may be operated by data generation, processing and exchange between computing devices. For example, a management system may be a system including at least one server, a plurality of user devices and various types of mobilities.

For a regular route moving object, an on-demand moving object and a flying moving object, a server may manage the hub use information, state information, riding information, arrival/departure time information and route information of a mobility, which are related to the use of a transit hub. Based on the above-described information, the server may provide the mobility with a message for controlling entry, a stop point, a departure point and get-on/off conditions at the transit hub. Based on the above-described information, the server may provide a user device with a get-on/off zone of a regular route moving object, expected departure/arrival time, and a moving route to the zone.

For a shared mobility, a server may receive use status information of mobilities in a sharing zone near a transit hub and provide a message inducing rental or return in the zone to a mobility or a user device. In addition, the server may receive mobility use status information according to a message, which is transmitted by another server processing a request of a user device for a sharing service, and manage a shared mobility. As another example, the server may not only manage a transit hub but also provide a sharing service for a sharing zone around a transit hub. According to this, the server may receive a use request of a shared mobility directly from a user device, generate a response message and perform overall management including the allocation, return, authentication and maintenance of a shared mobility. Based on location information of a sharing zone and a shared mobility and use status information, the server may provide a user device with a return zone of the mobility and a moving route to the zone.

In case a server provides a sharing service, a shared mobility may be authenticated and approved to be shared by a management system. As an example, a shared mobility may be a vehicle and a micro mobility which are registered to a management system. Herein, a system manager may provide a shared mobility for the management system. That is, only a vehicle and a micro mobility, which are authenticated or approved by the system manager may be used as a shared micro mobility. Thus, an accident that could occur due to the safety or management of a shared vehicle and a shared micro mobility in a management system may be prevented beforehand. Specifically, a mobility to be shared may be registered in a management system. The authority of registering a shared mobility to a management system may be limited by the management system. Herein, the shared mobility capable of being registered in the management system may have a same ID or same identification information. In addition, as a management system provides a shared mobility, the management system may perform management of the shared mobility. As an example, management for a shared mobility may be information necessary to provide a sharing service like state information or operation information of a shared mobility that is registered to a management system. Herein, the management system may check the state of a shared mobility in real time, and for a shared mobility having a problem, the permission for use may be restricted or a command of repair may be delivered through the system, based on which maintenance may be provided.

In addition, a management system may be a system including a plurality of devices and a plurality of mobilities. In addition, as an example, the management system may further include a road side unit (RSU) and the like. Herein, a device may be a smart phone, a smart pad and a smart watch. As another example, a device may be a device capable of performing other communication and exchanging a signal, which is not limited to the above-described embodiment. As another example, a RSU may be a roadside device capable of communication. In addition, as an example, a RSU may refer to a structure installed for transmitting and receiving a signal to and from a building or another area, which is not limited to the above-described embodiment. However, for convenience of explanation, such structures will be referred to as RSUs in the description below. RSUs may be various structures or device, which is not limited to the above-described embodiment.

Figure 3:
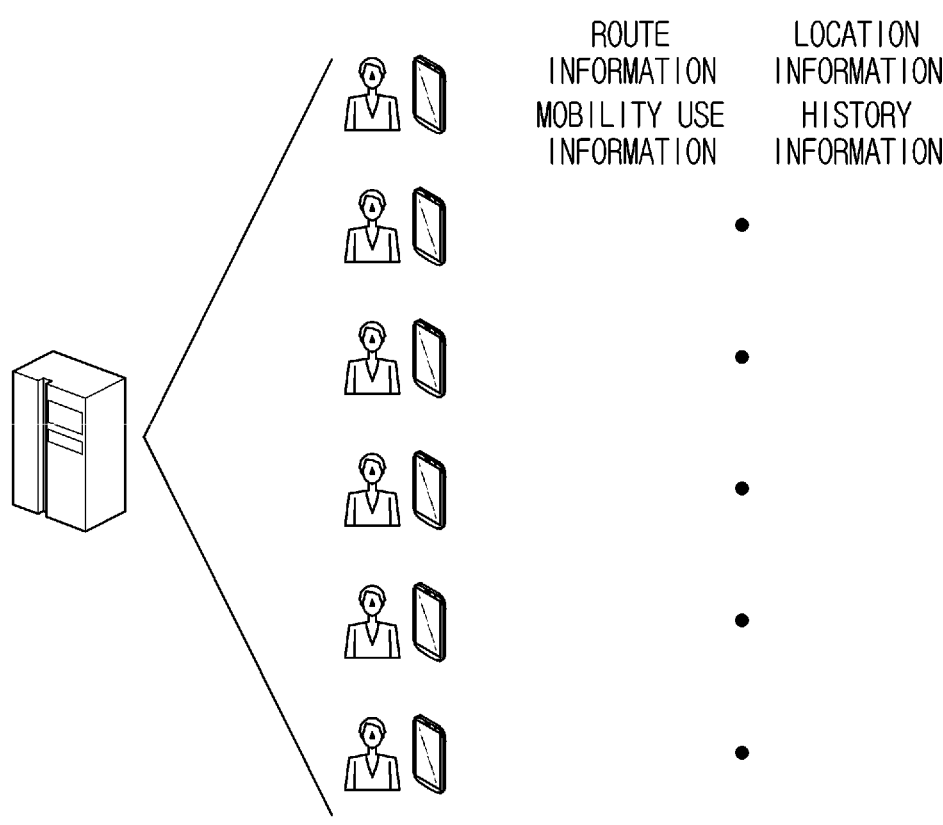
FIG. 3 is a view illustrating that a user device is managed based on a management system.

FIG. 3 is a view illustrating that a user device is managed based on a management system.

In a management system, a user device may be managed. Herein, as an example, information of each user may be managed in the management system. As an example, user information may be information on the user' use of a transit hub based on user identification ID or the user's identification device. For a more concrete example, information of each user may include at least one among each user's route information, mobility use information, location information and history information.

Route information may be input through a user device and be transmitted to a server. Route information may be determined from information on a departure point and a destination point, which is input by a user device. Route information may include not only at least one geographical route from a departure point to a destination but also at least one of available mobility information associated with various types of mobilities, which are available in a geographical route, and information on a user's transfer between different mobilities. Through an application implemented in a user device, a user may select information on an available mobility on the route or transfer information prearranging or requesting transfer of a moving object at a transit hub. As information for prearranging a user's transfer, transfer information may include, for example, transit hub information between different mobilities, together with available mobility information associated with a combination of mobilities to be interconnected. Also, as a user's transfer request, transfer information may include a mobility to be changed at a transit hub, for example, a use request or reservation information of a mobility. When an event is detected in which a user uses a moving object or intends to use the moving object according to route information, the route information may be transmitted to a server in order to estimate the use of the mobility at a transit hub. For example, a use intention event may be detected based on an activity information of a user using a user device. The activity information may include at least one of actual movement information, which is grounded on location information of a user device, use of a mobility and a use request of a moving object, which are provided by available mobility information, reservation or inquiry and search for a moving object at a transit hub.

Mobility use information may be transmitted from a user device or a mobility management server and include information, which is related to a use request for a mobility to be used at a transit hub and a return request of a shared mobility, and riding information associated with a mobility that a user uses to arrive at a transit hub.

As an example, a user's location information may be information enabling a user's location to be identified at a transit hub through a communication module installed at each of predetermined zones of the hub and via communication of a user device. A user's location information may be identified using tags, which are installed at a ticket gate, a specific point of a transit hub and a doorway to an affiliated zone leading to a transit hub, or using a beacon, NFC and a local area communication module. As another example, based on get-off information from a mobility or return information of the mobility, location information may be estimated to be an affiliated zone related to the mobility.

A user's history information may be history information related to using a mobility at a transit hub. History information may be information on a user's propensity, which is analyzed based on a type of a mobility used by a user. As an example, a management system may check an affiliated zone related to a mobility based on a user's history information. History information may include use pattern data of a mobility at a transit hub and be generated by collecting use pattern data according to each user. As an example, use pattern data may be generated based on at least one among a user's consumption information around a transit hub, past destinations from the transit hub, and a use pattern of a mobility at the transit hub when there is a companion.

As an example, the above-described various information may be received and managed in a server controlling a management system, when a user enters a transit hub. As another example, at least some of the above-described information may be stored in a user device capable of communicating in a system and a mobility.

Figure 4:
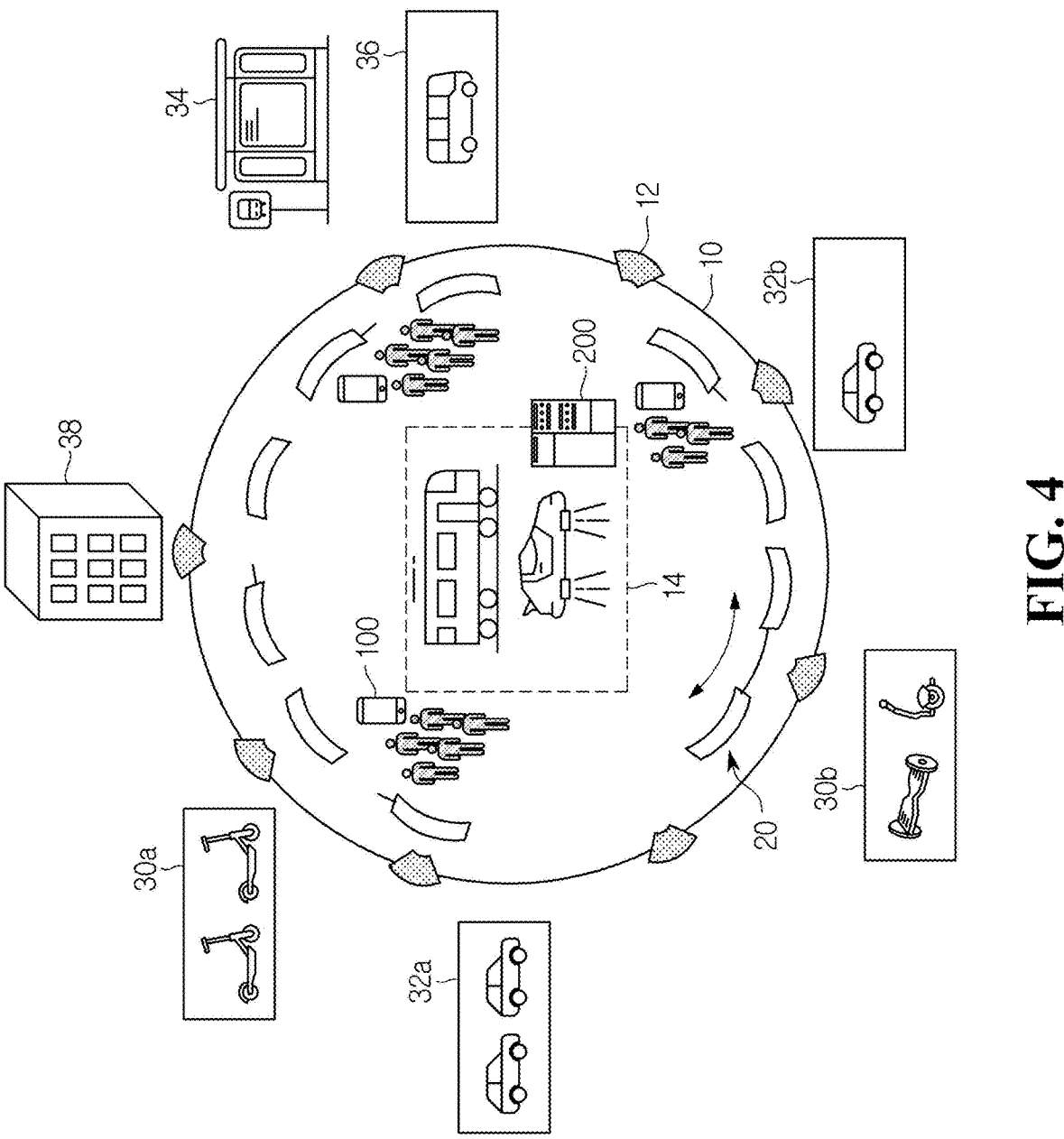
FIG. 4 is a view illustrating an example of mobility transit hub.

FIG. 4 is a view illustrating an example of mobility transit hub.

A mobility transit hub 10 may be a space in which various mobilities stop for transit service or which includes affiliated zones 30 to 38 connected to neighboring facilities. The affiliated zones 30 to 38 may have a hub platform 14 for a first mobility, which enters and stops at the transit hub 10, and mobility transit zones 30 to 36 for a second mobility, which is provided close to the hub 10 and thus can be connected with the first mobility. As another example, the affiliated zones 30 to 38 may further include a surrounding facility zone 38, which includes at least one of a residential building and a commercial building, not a passage facility.

A first mobility using the hub platform 14 may be a means of transportation, which employs the transit hub 10 as a stop or destination and receives permission from or is controlled by a server 200 in charge of the transit hub 10 in order to enter into (stop), depart from or stand by at the transit hub 10. For example, a first mobility may be a subway train, a metropolitan train, a bus, a tram, a BRT and an aerial vehicle. An aerial vehicle may be an aircraft for long-distance flight, an aircraft or UAM provided only for shuttling within a predetermined region, a privately-owned small aircraft, a small aircraft exclusively provided to particular users, and the like.

In case a first mobility stops regularly at the hub platform 14, the server 200 may receive scheduling information associated with entering and leaving at the transit hub 10 from a mobility management server, which performs overall management of the allocation, scheduling and operational status of the first mobility, and control the entry, stand-by and stopping point allocation of the first mobility at the hub platform 14. As another example, the server 200 may receive, from a first mobility management server, reservation information on a passenger getting on or off the transit hub 10 or information on an actual mobility user and estimate use demand information of the transit hub 10. As yet another example, in case a first mobility approaches the transit hub 10 within a predetermined range of distance, the server 200 may receive information on an actual mobility user from at least one of a first mobility management server and the first mobility and estimate use demand information.

In case a first mobility stops irregularly at the hub platform 14, a mobility management server may deliver, to the server 200, information on expected arrival time of the first mobility and information on an actual user along with a message about the first mobility's expected use of the transit hub 10. As another example, in case a first mobility approaches the transit hub 10 within a predetermined range of distance, the server 200 may receive information on expected arrival time and information on an actual user from at least one of a first mobility management server and the first mobility and estimate use demand information of the transit hub 10.

A second mobility may be a means of transportation, which provides a transportation service to a user through the transit zones 30 to 36 and receives a looser control of the server 200 than a first mobility. The second mobility under a looser control may not receive, from the server 200 of the transmit hub 10 in principle, permission to stop and park at the transit zones 30 to 36. Exceptionally, in case there are a plurality of mobility transit zones 30 to 36 of a same type, the server 200 may control and induce a second mobility to stop and park at the specific transit zones 30 to 36 with approval of a second mobility management server in order to reduce a degree of congestion at the transit zones 30 to 36 and at an exit of the hub 10 leading thereto. Operation and use status of a second mobility, a user request for the second mobility and information on corresponding processing may be controlled and managed by a second mobility management server. In response to a request of the server 200, a second mobility management server may provide status information such as departure/arrival time information of a second mobility at the transit hub 10, rental/return information at the transit hub 10, and the number of mobilities parked at the transit hub 10.

Such a second mobility may be, for example, a shared mobility, a regular route moving object, and an on-demand shuttle. A mobility according to each type may be a moving object illustrated in FIG. 1. In addition, the transit zones 30 to 36 may be provided around the transit hub 10 or at a predetermined point within the hub 10. According to a type of a second mobility, a transmit zone may include shared mobility zones 30a, 30b, 32a and 32b, a regular route moving object zone 34, and an on demand moving object zone 36.

Meanwhile, in the mobility transit hub, a plurality of doorways 12 may be allocated which correspond to entry points, in which a user may move to either the hub platform 14 and or the affiliated zones 30 to 38, and at least one guide apparatus 20 for adjusting the passage of users moving to the affiliated zones 30 to 38 may be provided.

The doorway 12 may be placed for entry into the affiliated zones 30 to 38 and, if necessary, be additionally placed in a direction irrelevant to the affiliated zones 30 to 38. The guide apparatus 20 may be provided to correspond to a predetermined doorway 12. As an example, the guide apparatus 20 may be provided in accordance with an entry point, which has higher movement demand than another doorway 12, that is, a doorway 12 connected with at least one of the affiliated zones 30 to 38. As another example, the guide apparatus 20 may be provided in accordance with the number of doorways 12.

In addition, the guide apparatus 20 may be so configured as to install a facility for controlling passage of users directly at the doorway 12. As another example, in order to control the guide apparatus 20 more smoothly and to alleviate uses' discomfort at the doorway 12, the guide apparatus 20 may be provided as a device independent of the doorway 12 so that the guide apparatus 20 may perform adequate control at a request of the server 200 by moving between the doorways 12. Hereinafter, for convenience of explanation, an example will be described in which the guide apparatus 20 is provided as a device independent of the doorway 12.

The guide apparatus 20 moves along each doorway 12 connected to a plurality of affiliated zones 30 to 38 and may be equipped with a means to adjust the number of users passing at the doorway 12. In addition, in order to easily identify a location of the affiliated zones 30 to 38, which a user intends to approach, and the guide apparatus 20 corresponding to the affiliated zones 30 to 38, the guide apparatus 20 may be further equipped with an indication unit that is capable of indicating route information for approaching the affiliated zones 30 to 38, that is the zones associated with the guide apparatus 20.

Figure 5:
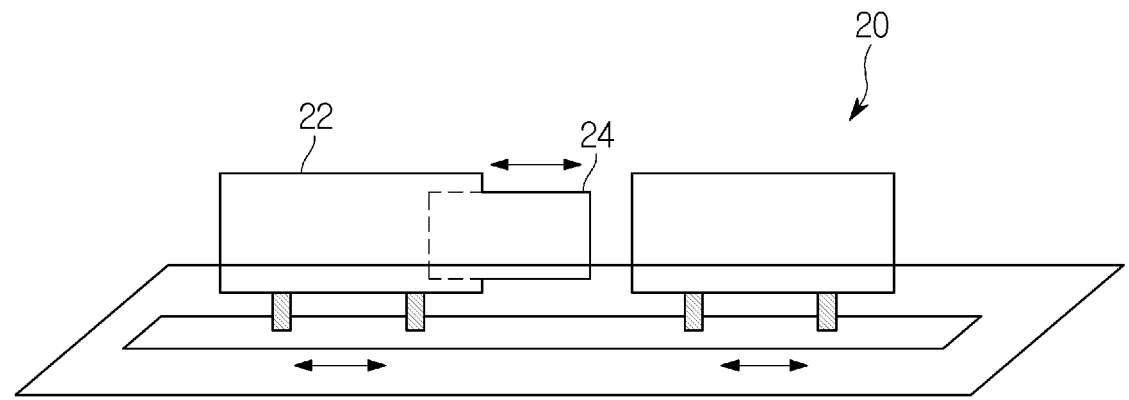
FIG. 5 is a view illustrating a guide apparatus.

Specifically, as exemplified in FIG. 5, the guide apparatus 20 may be installed on a track on the ground surface of the transit hub 10 and move along the track to the doorway 12 designated by the server 200. FIG. 5 is a view illustrating a guide apparatus. The guide apparatus 20 illustrated in FIG. 5 may be equipped with a guardrail 22, which is driven along the track, and a gate 24 that is coupled to the guardrail 22 and of which the openness is adjusted according to a command of the server 200. The gate 24 may not only control the number of users passing the doorway 12 but also let a user perceive whether the user is being induced to or restrained from using the doorway 12 in accordance with openness. The guide apparatus 20 is described with reference to FIG. 5 but is not limited thereto, and the guardrail and the gate may be modified in various ways.

As another, the guide apparatus 20 may not be accompanied by a track but be autonomously driven along a predetermined route be between the doorways 12 adjacent to a plurality of affiliated zones 30 to 38, thereby being moved to a designated doorway 12. The server 200 may set the predetermined route based on map information in the transit hub 10. As yet another example, without depending on a track and a predetermined route, the guide apparatus 20 may autonomously drive by identifying a route to the doorway 12 designated by the server 200 on its own, while referring to the map information and recognizing a dynamic obstacle. The guide apparatus 20 is described by the above-described example but is not limited thereto and may be implemented in various forms.

Figure 6:
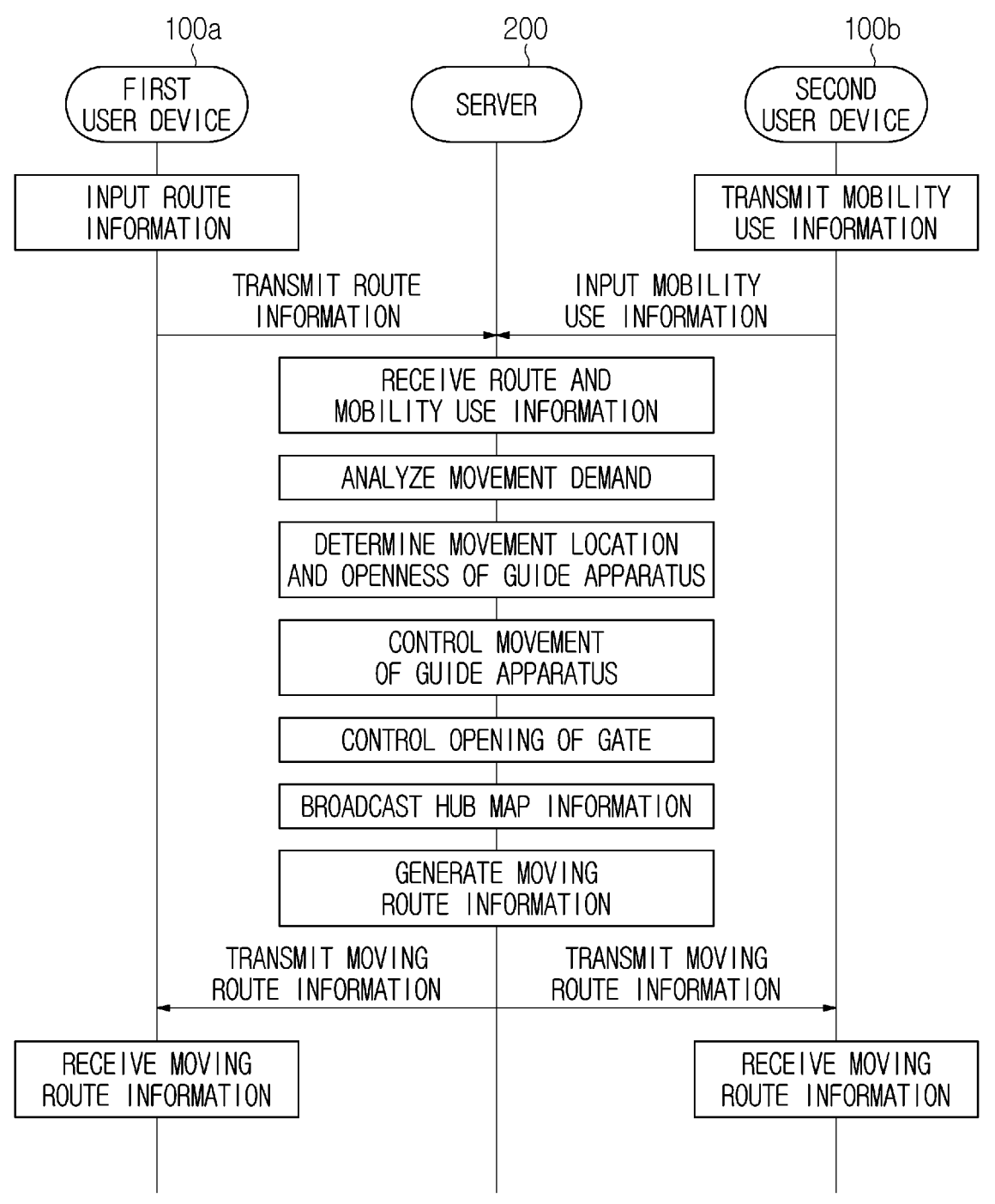
FIG. 6 is a flowchart showing a method for guiding users in a mobility transit hub according to an embodiment of the present disclosure.

FIG. 6 is a flowchart showing a method for guiding users in a mobility transit hub according to an embodiment of the present disclosure.

A management system for managing the mobility transit hub 10 may include the server 200 and the user devices 100a and 100b, and the server 200 may receive user information from the devices 100a and 100b of users who use or are going to use the mobility transit hub 10.

In this regard, the server 200 may provide an application for hub to a user of the transit hub 10. The application for hub may provide a user using the transit hub 10 with information on getting on/off a mobility of the hub 10, indoor geography information and route information. For example, the information on getting on/off a mobility may include departure/arrival time information of a first mobility, stop point information of the first mobility at the hub platform 14, and the like. For example, the indoor geography information may provide a user with detailed information of the hub platform 14 of the transit hub 10, location information of the affiliated zones 30 to 38, and location information of various facilities within the hub 10 by expressing these pieces of information in visual map graphics. For example, the route information may provide a user with a route leading to a desired point within the transit hub 10 in a form of indoor map. At a request of the server 200, the application for hub may be connected with each mobility management server, which manages a first mobility and a second mobility, and transmit and receive various information. As another example, in case the mobility transit hub 10 directly operates a sharing service of neighboring mobilities, the server 200 may use various data that are generated by the sharing service. In addition, the application for hub may communicate with an external application or external support server, which supports a user to move to a specific destination, and may obtain user-related information. In case user information occurs which employs the transit hub 10 as a destination or a waypoint for transferring to another mobility, the application for hub may be provided to the user devices 100a and 100b as a push. In addition, in case the application for hub is already built in the user devices 100a and 100b, the server 200 may activate the application in the user devices 100a and 100b, when a user reaches a predetermined distance from the transit hub 10.

In this embodiment, the server 200 may receive route information and information on first and second mobilities using the transit hub 10 from itself or at least one external server, which will not be distinguished in the description below.

First, the first and second user devices 100a and 100b may input route information and mobility use information respectively, and the server 200 may receive user information including the route information and the mobility use information.

The first user device 100a may already input route information before reaching the transit hub 10 or may input route information either spontaneously or at a request of the server 200 after reaching the transit hub 10. Route information may be at least one of destination information and transfer information. Destination information may be a point near the transit hub 10 or a place that is reached by transferring to another mobility at the transit hub 10. In case route information is input beforehand, the server 200 may receive the route information when a user gets off or is going to get off at the transit hub 10 by using the first mobility. For example, when the user designates the transit hub 10 as a final destination by the first mobility, the server 200 may determine that the user is going to get off at the transit hub 10. In case the user does not specify or is incapable of designating a final destination of the first mobility, the server 200 may identify the user's getting off when the user passes a module capable of identifying the user's getting off at the transit hub 10, for example, when the user passes a ticket gate of the hub platform 14. In case the user inputs a destination and selects a route using the first mobility and another mobility at the transit hub 10, the server 200 may identify the user's expected getting off at the transit hub 10.

In case route information is input beforehand, the server 200 may receive route information when it is shown that a user arrives or is going to arrive at the mobility transit zones 30 to 36 using a second mobility. For example, in case a user makes no reservation to use a first mobility but arrives at or returns a second mobility to the sharing mobility zones 30a, 30b, 32a and 32b or the regular route moving object zone 34 and then reserves the first mobility that is going to stop at the transit hub 10 in order to go to a destination, the server 200 may identify route information after the user returns or gets off the second mobility. Herein, getting off a regular route moving object may be inferred based on location information of the user device 100a. In addition, in case the user inputs a destination and selects a route using the second mobility and another mobility at the transit hub 10 beforehand, the server 200 may recognize expected arrival at the transit hub 10.

The second user device 100b may input mobility use information before and after arriving at the transit hub 10, and the server 200 may receive the information. The mobility use information may include use request information of the first and second mobilities to be changed at the transit hub 10 and information on a request to return a shared mobility to the transit hub 10.

Meanwhile, user information may further include history information that stores cumulatively data associated with a transit mobility which is already used at the transit hub 10. The history information may be updated and stored in the server 200 and include at least one of mobility transfer pattern data according to each user and statistical mobility transfer data by time. As an example, when a user device, which has not input route information and mobility use information, is identified to be located in the transit hub 10, the server 200 may check a past transit mobility used by a user by referring to the user's transfer pattern data and may predict and analyze movement demand for each of the affiliated zones 30 to 38 based on the transit mobility thus checked. In addition, the server 200 may estimate movement demand of each of the affiliated zones 30 to 38 by referring to hourly statistical transfer data.

In the above description, the first and second user devices 100a and 100b transmit route information and mobility use information respectively, but it is not excluded that a single device may transmit both route information and mobility use information.

Next, the server 200 may analyze movement demand of a user moving to each of the affiliated zones 30 to 38, which are connected with the transit hub 10, based on at least one of route information and mobility use information.

As described above, in case route information expects a route using another transit mobility at the transit hub 10 or mobility use information includes a use request for a transit mobility, the server 200 may analyze demand for movement to corresponding transit mobility zones 30 to 36 by collecting the number of users who are going to use expected or requested transit mobilities.

In addition, even when a specific transit mobility is not expected from route information, the server 200 may determine whether or not the route information includes information on a location point reachable by a transit mobility that is provided by the transit hub 10. As a result, when determining as described above, the server 200 may search for a transit mobility based on the information on the location point. The server 200 may determine that the number of people, which is estimated based on the first user device 100a transmitting the route information, has potential demand for a transit mobility. The server 200 may analyze movement demand of the affiliated zones 30 to 38 associated with a transit mobility by adding potential demand.

Next, based on movement demand of each of the affiliated zones 30 to 38, the server 200 may determine not only a movement location of the guide apparatus 20 but also openness of the guide apparatus 20 in order to adjust passage of users to each of the affiliated zones 30 to 38.

Describing by the example of FIG. 4, in case movement demand in the regular route moving object zone 34 and some shared mobility zones 30*a*, 30*b*, 32*a* and 32*b* is equal to or greater than a predetermined value, the server 200 may determine indoor location information associated with each of the zones 30*a*, 30*b*, 32*a*, 32*b* and 34, which a plurality of guide apparatuses 20 are to approach, based on indoor geography information of the transit hub 10. For example, as exemplified in FIG. 5, in case the guide apparatus 20 moves along a track, indoor location information thus determined may be a point on the track corresponding to the doorway 12 of the corresponding zones 30*a*, 30*b*, 32*a*, 32*b* and 34. In addition, the server 200 may determine to move, for example, the guide apparatus 20 located at the affiliated zones 30 to 38 where movement demand is lower than a minimum value. In case a plurality of guide apparatuses 20 move along a track, the server 200 may determine movement locations of all the guide apparatuses 20 to be shifted so that a guide apparatus 20 of the affiliated zones with a value equal to or lower a minimum value may be shifted to another zone and a guide apparatus 20 of another zone may be provided close to the zones 30*a*, 30*b*, 32*a*, 32*b* and 34.

For example, the server 200 may determine openness of the gate 24 of the guide apparatus 20 illustrated in FIG. 5, based on movement demand. For example, openness may be determined discretely for each range of the expected number of passers-by, which is estimated from movement demand. In the description above, the location of the guide apparatus 20 changes according to movement demand. However, as another example, as an analysis result of movement demand, when the server 200 determines that movement demand may be satisfied by maintaining a current location of the guide apparatus 20, the current location may be determined as a movement location of the guide apparatus 20. Nevertheless, when the server 200 analyzes, based on user information, that movement demand of the affiliated zones 30 to 38, which are already matched with the guide apparatus 20, is fluctuating, the server 200 may adjust openness of the guide apparatus 20 according to the fluctuating demand.

Next, the server 200 may control at least one guide apparatus 20 according to a determined movement location so that the guide apparatus 20 may move to the doorway 12 corresponding to the affiliated zones 30 to 38. As another example, in case a current location is determined as a movement location, the guide apparatus 20 may be operated to stay at the matched doorway 12 without movement. Next, the server 200 may control an opening operation of the gate 24 illustrated in FIG. 5 according to openness that is determined based on movement demand analyzed for each of the affiliated zones 30 to 38. Depending on openness of the gate 24, a user may perceive inducement or restraint of moving to each of the affiliated zones 30 to 38 so that the user may be led to one of the affiliated zones 30 to 38 meeting movement demand.

Figure 7:
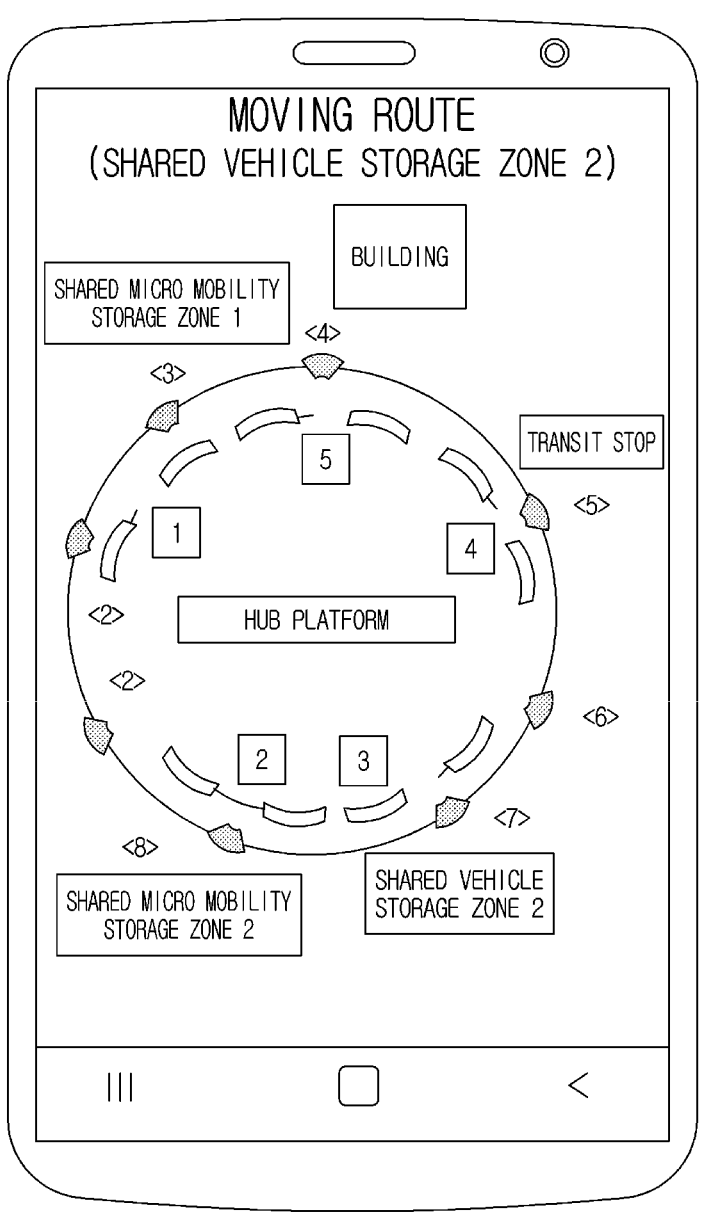
FIG. 7 is a view illustrating that moving route information to a mobility transit zone is provided to a user device.

Next, as exemplified in FIG. 7, the server 200 may broadcast hub map information, which provides locations of the affiliated zones 30 to 38 of the transit hub 10, the doorway 12 and the guide apparatus 20 that is located to be connected with the affiliated zones 30 to 38 and the doorway 12, to the user devices 100*a* and 100*b*. FIG. 7 is a view illustrating that moving route information to a mobility transit zone is provided to a user device.

Hub map information may represent visually indoor geography information of the transit hub 10. As the locations of the affiliated zones 30 to 38 and the doorway 12 are static facilities, hub map information may represent the static facilities at fixed locations without modifications. On the other hand, as the guide apparatus 20 is a dynamic facility that varies according to movement demand, hub map information may provide a modified location according to a movement of the guide apparatus 20 in real time.

Hub map information may be transmitted not only to the user devices 100*a* and 100*b*, which transmit user information, but also to every device which does not transmit user information but uses the transit hub 10. The server 200 may transmit a push to a device that does not transmit user information. In addition, in order to further improve user convenience, the server 200 may control the guide apparatus 20 so that the guide apparatus 20 may display the affiliated zones 30 to 38 on its display unit, which are accessible through the guide apparatus 20.

Next, based on user information transmitted from the user devices 100*a* and 100*b*, the server 200 may generate moving route information and transmit moving route information on a hub map, as exemplified in FIG. 7. Specifically, the hub map may show a route from a current location to the affiliated zones 30 to 38, which a user will move to, that is, the user's destination within the hub identified based on route information and mobility use information. Accordingly, the first and second user devices 100*a* and 100*b* may receive moving route information, easily identify the guide apparatus 20, which enters the affiliated zones 30 to 38, and move conveniently to the affiliated zones 30 to 38. When a user device requests a route to a specific affiliated zone on the hub map, although not transmitting, the server 200 may generate and transmit moving route information based on indoor geography information.

According to this embodiment, as the guide apparatus 20 is configured to move along the affiliated zones 30 to 38 in the transit hub 10 and to adjust the number of users moving to the affiliated zones 30 to 38, a management system may operate the mobility transit hub 10 so as to enhance transit convenience of users and reduce congestion of the transit hub 10.

Figure 8:
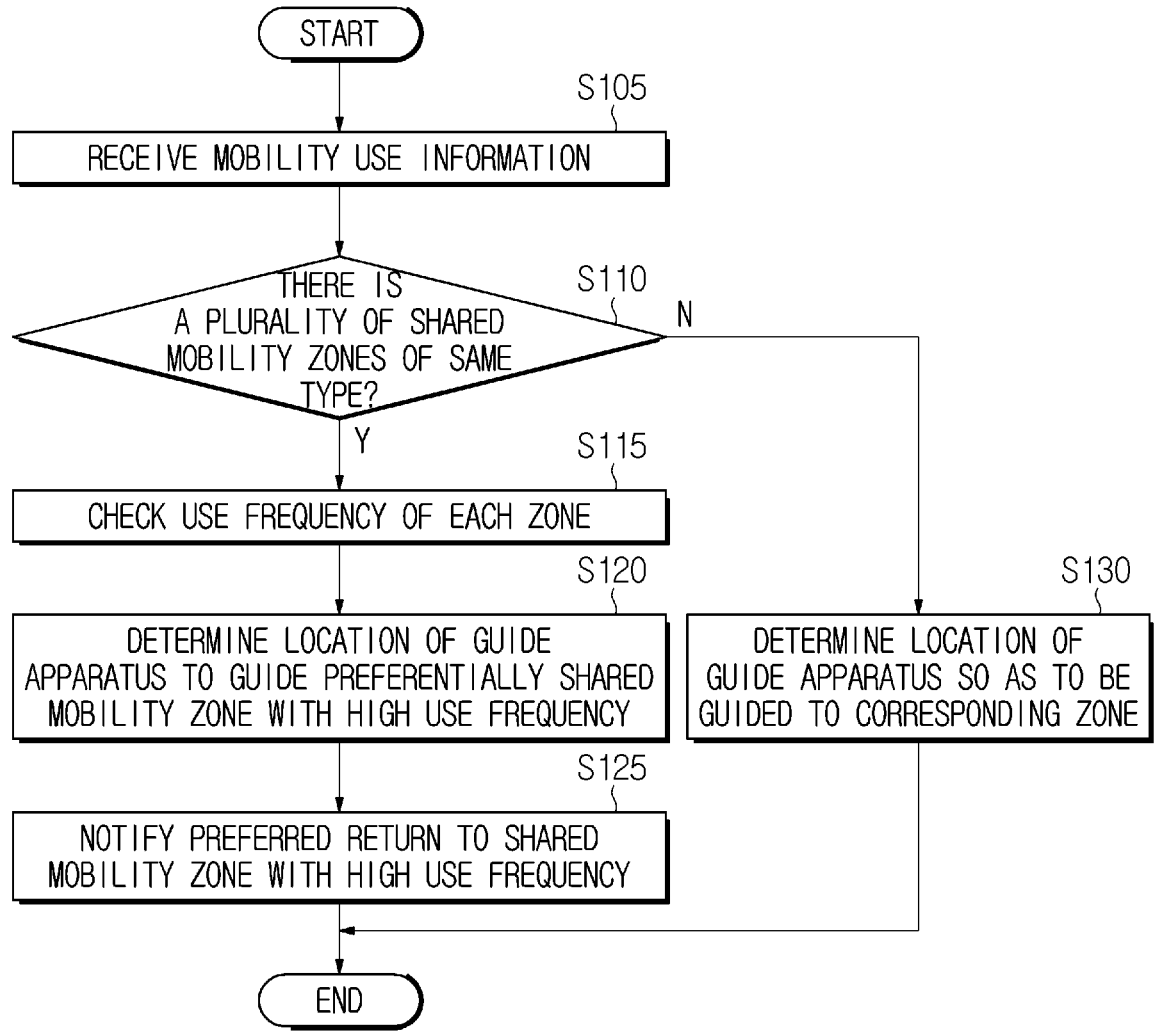
FIG. 8 is a flowchart showing a process of guiding users using transit control of a guide apparatus based on a use frequency of a mobility transit zone.

FIG. 8 is a flowchart showing a process of guiding users using transit control of a guide apparatus based on a use frequency of a mobility transit zone.

First, like in FIG. 6, the server 200 may receive user information, which includes mobility use information, from the user devices 100 (S105). In this embodiment, for convenience of explanation, the server 200 is described to control a guide apparatus based on mobility use information associated with a shared vehicle and use frequency information of each shared vehicle zone 32*a* and 32*b*.

The server 200 may receive multiple pieces of mobility use information on a shared vehicle from the user devices 100. Use information of a shared vehicle may include, for example, users' reservations for a shared vehicle to be used as a transit mobility and users' reservations for a shared vehicle, who have entered the transit hub 10 from a surrounding facility zone 38 or another doorway 12. In addition, the use information may include a request to return a shared vehicle from the user devices 100 to the transit hub 10 or an expected return time at the time of use request.

Next, the server 200 may check whether or not there are a plurality of shared mobility zones of a same type around the transit hub 10 (S110). A same type of shared mobility zone may mean that shared mobilities are of the same type in multiple zones. In the example of FIG. 4, the 2 shared vehicle zones 32*a* and 32*b* and the 2 shared micro mobility zones 30*a* and 30*b* may be zones of the same type, respectively. According to the above-described example, the shared mobility zones may be the shared vehicle zones 32a and 32b.

When, as exemplified in FIG. 4, it is identified that there are a plurality of shared vehicle zones 32a and 32b (Y of S110), the server 200 may check use frequency for each shared vehicle zone 32a and 32b (S115). Herein, use frequency may be calculated, for example, from rental and return information of all shared vehicles at each zone 32a and 32, which is included in history information. Based on use frequency of each zone 32a and 32b, the server 200 may predict and analyze movement demand for the plurality of shared vehicle zones 32a and 32b.

Next, in order to suggest preferentially a shared mobility zone with high use frequency, for example, the shared vehicle zone 32a, among a plurality of vehicle mobility zones, the server 200 may determine a movement location of the guide apparatus 20 as a location corresponding to the doorway 12 of the zone 32a with high use frequency (S120). In addition, the server 200 may determine openness of the guide apparatus 20 according to movement demand that is predicted at a zone with high use frequency. A zone with high use frequency may be estimated as an area for which users have high preference for various reasons, and the server 200 may control a management to lead users to a shared mobility zone with high preference in order to improve user satisfaction with a transit service.

Next, the server 200 may identify a shared vehicle to be returned based on return information, which is included in use information of the shared vehicle, and transmit a request of preferred return to a shared mobility zone (e.g., shared vehicle zone 32a) with high use frequency to the user device 100 associated with the identified shared vehicle and/or the corresponding vehicle (S125). The return information may include a request to return the shared vehicle to the transit hub 10 or an expected return time at the time of use request.

Next, like in FIG. 6, the server 200 may move the guide apparatus 20 to the shared vehicle zone 32a with high use frequency and control an opening operation of the gate 24. In addition, the server 200 may broadcast hub map information and transmit information on a moving route to the zone to the user device 100 which transmits mobility use information.

Meanwhile, in case there is one shared vehicle zone (N of S110), the server 200 may analyze movement demand at the one shared vehicle zone 32 based on use information of a shared vehicle and, in order to lead a user to the zone 32, may determine a movement location of the guide apparatus 20 and openness according to the movement demand (S130).

Figure 9:
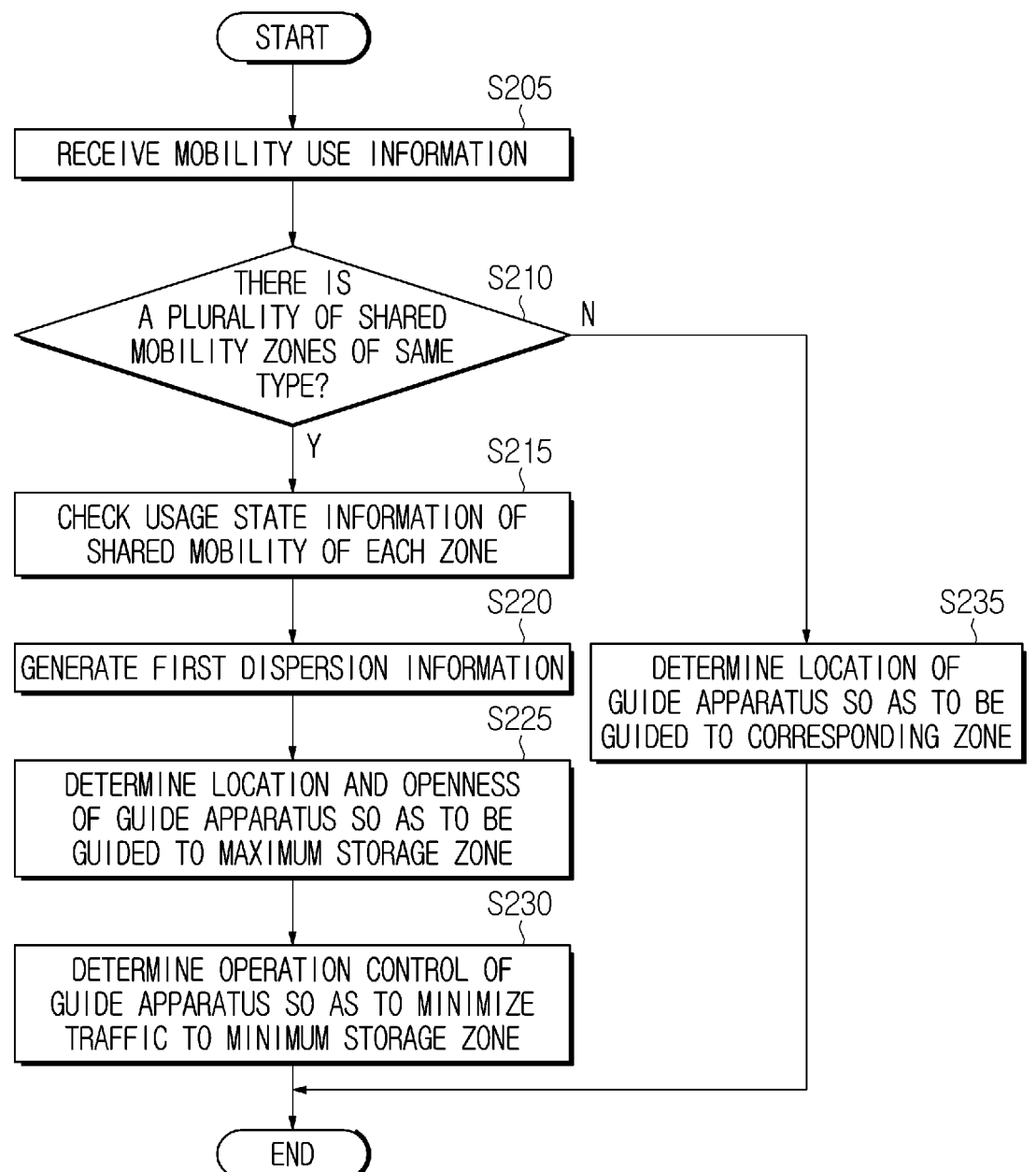
FIG. 9 is a flowchart showing a process of guiding users using transit control of a guide apparatus based on a mobility status of a mobility transit zone.

FIG. 9 is a flowchart showing a process of guiding users using transit control of a guide apparatus based on a mobility status of a mobility transit zone.

First, same as FIG. 8, the server 200 may receive user information, which includes mobility use information, from the user devices 100 (S205). In this embodiment, for convenience of explanation, the server 200 is also described to control a guide apparatus based on mobility use information associated with a shared vehicle and usage state information of each shared vehicle zone 32a and 32b.

The server 200 may receive multiple pieces of mobility use information on a shared vehicle from the user devices 100. Use information of a shared vehicle is the same as illustrated in FIG. 8, and a detailed description will be skipped.

Next, the server 200 may check whether or not there are a plurality of shared mobility zones of a same type around the transit hub 10 (S210). According to the above-described example, the shared mobility zones may be the shared vehicle zones 32a and 32b.

When, as exemplified in FIG. 4, it is identified that there are a plurality of shared vehicle zones 32a and 32b (Y of S210), the server 200 may check usage state information of a shared vehicle at each shared vehicle zone 32a and 32b (S215). Herein, in case the transit hub 10 provides a shared vehicle service, the usage state information of each zone may be obtained by the server 200, or in case an external system provides the service, the usage state information may be received from an external shared vehicle management server. The usage state information may be generated based on for example, retention information of shared vehicles at respective sharing vehicle zones 32a and 32b, use requests (or reservations) for shared vehicles at the zones 32a and 32b and return information.

Next, the server 200 may analyze movement demand of each affiliated zone 30 to 38 based on user information including use information of a shared vehicle and may generate first dispersion information for distributing users of shared vehicles according to respective shared vehicle zones 32a and 32b based on movement demand and usage state information at respective zones 32a and 32b (S220).

Movement information, which is used to generate the first dispersion information, may be analyzed based on use information of users' shared vehicles that will move to respective zones 32a and 32b and route information expecting shared vehicles. In this embodiment, it is illustrated that the server 200 generates the first dispersion information in order to lead as many users of shared vehicles as possible to the shared vehicle zone 32a that is expected to keep a maximum number of shared vehicles based on usage state information. As an example, the first dispersion information may have a movement location of the guide apparatus 20 which is to be matched to the doorway 12 corresponding to the maximum storage zone 32a. As another example, the first dispersion information may determine the movement location of the guide apparatus 20 to the maximum storage zone 32a, and at the same time may set another guide apparatus 20, which is already located at the minimum storage zone 32b, to stay without movement. As yet another example, in case openness of the gate 24 is set according to the number of passers-by, the server 200 may calculate an expected number of passers-by for each of the maximum and minimum storage zones 32a and 32b and set differently openness of each guide apparatus 20 according to the calculated number of passers-by. In this case, the server 200 may set an expected number of passers-by at the maximum storage zone 32a to be larger than an expected number of passers-by at the minimum storage zone 32b, and the first dispersion information may be set so that openness at the guide apparatus 20 of the maximum storage zone 32a is larger than openness at the minimum storage zone 32b. Thus, the first dispersion information may include not only the movement location of the guide apparatus 20 but also openness that is set differently for each guide apparatus 20.

Next, based on the first dispersion information, in order to lead a user of a shared vehicle to the maximum storage zone 32a, the server 200 may determine openness of the gate 24, while determining the movement location of the guide apparatus 20 to be a location of the doorway 12 that is matched to the maximum storage zone 32a (S225).

Next, based on the first dispersion information, in order to minimize passage to the minimum storage zone 32b, the server 200 may determine movement control of the guide apparatus 20 that is matched to the minimum storage zone 32b (S230). For example, based on the first dispersion information, the movement control may be determined to move and match the guide apparatus 20 to the minimum storage zone 32b or to maintain a location of the guide apparatus 20 that is already matched. In addition, the movement control may be determined so that the openness of the guide apparatus 20, either moved or maintained, is set based on first dispersion information, for example, the number of passers-by that is set to be smaller than at a maximum storage zone.

Next, same as FIG. 6, the server 200 may move the guide apparatus 20 to the respective shared vehicle zones 32a and 32b and also control an opening operation of the gate 24. In addition, the server 200 may broadcast hub map information and transmit information on a moving route to the zone to the user device 100 which transmits mobility use information.

Meanwhile, in case there is one shared vehicle zone (N of S210), the server 200 may analyze movement demand at the one shared vehicle zone 32 based on use information of a shared vehicle and, in order to lead a user to the zone 32, may determine a movement location of the guide apparatus 20 and openness according to the movement demand (S235).

According to this embodiment, as a user of a shared vehicle may rent conveniently an available shared mobility without delay, a management system may provide transit convenience.

Figure 10:
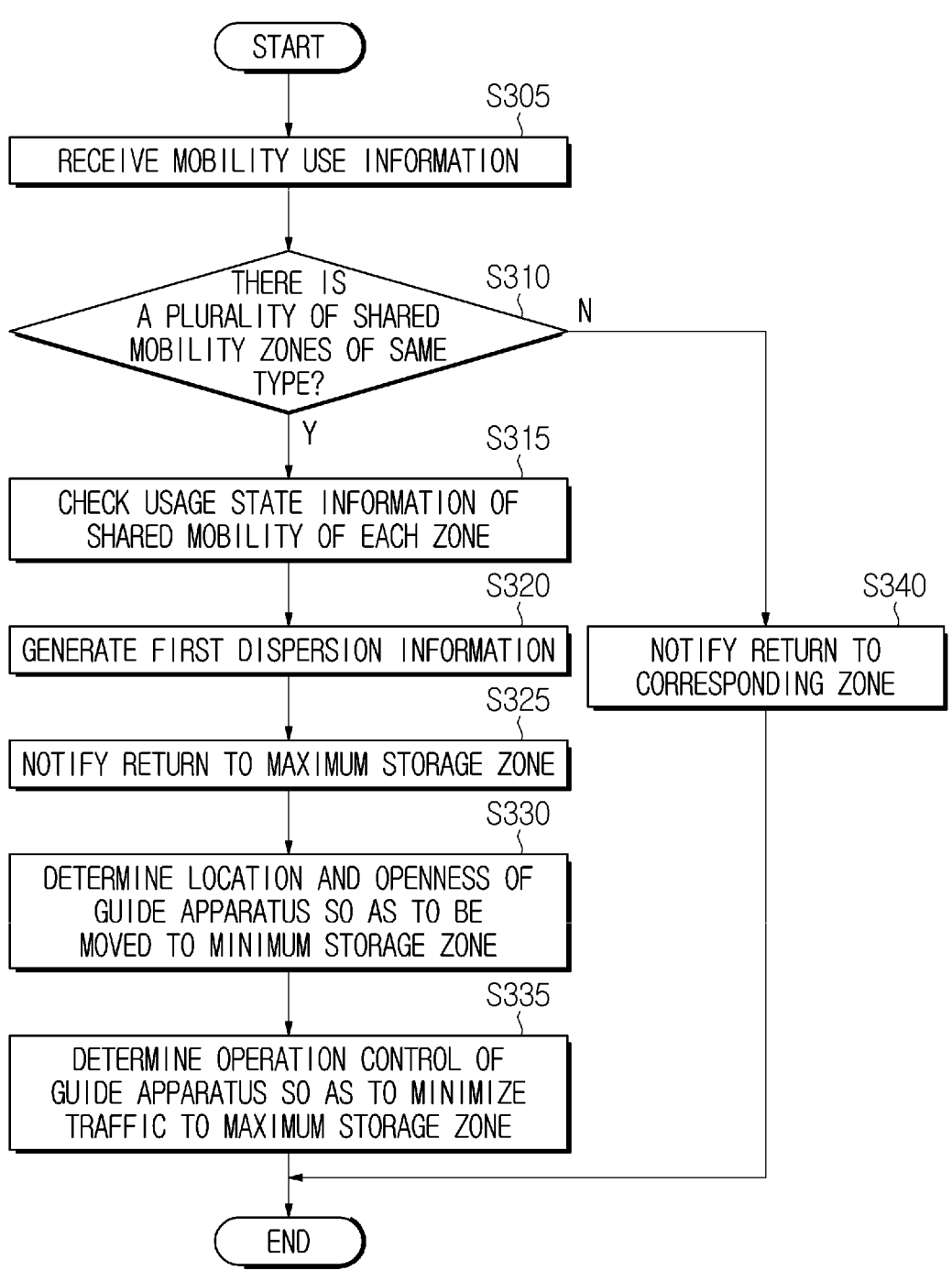
FIG. 10 is a flowchart showing a process of returning a shared mobility based on a mobility status of a mobility transit zone.

FIG. 10 is a flowchart showing a process of returning a shared mobility based on a mobility status of a mobility transit zone.

As a different embodiment from FIG. 9, this embodiment illustrates that the server 200 generates first dispersion information in order to induce return of as many shared vehicles as possible to the shared vehicle zones 32a and 32b that are expected to keep a minimum number of shared vehicles based on usage state information.

First, like in FIG. 8, the server 200 may receive user information, which includes mobility use information, from the user devices 100 (S305). In this embodiment, for convenience of explanation, the server 200 is also described to control a guide apparatus based on mobility use information associated with a shared vehicle and usage state information of each shared vehicle zone 32a and 32b.

The server 200 may receive multiple pieces of mobility use information on a shared vehicle from the user devices 100. Use information of a shared vehicle is the same as illustrated in FIG. 8, and a detailed description will be skipped.

Next, the server 200 may check whether or not there are a plurality of shared mobility zones of a same type around the transit hub 10 (S310). According to the above-described example, the shared mobility zones may be the shared vehicle zones 32a and 32b.

When, as exemplified in FIG. 4, it is identified that there are a plurality of shared vehicle zones 32a and 32b (Y of S310), the server 200 may check usage state information of a shared vehicle at each of the shared vehicle zones 32a and 32b (S315). Usage state information of each zone is actually the same as described in FIG. 9.

Next, the server 200 may analyze movement demand of each affiliated zone 30 to 38 based on user information including use information of a shared vehicle and may generate first dispersion information for distributing users of shared vehicles according to respective shared vehicle zones 32a and 32b based on movement demand and usage state information at respective zones 32a and 32b (S320).

Movement information, which is used to generate the first dispersion information, may be analyzed based on use information of users' shared vehicles that will move to respective zones 32a and 32b and route information expecting shared vehicles. As described above, the first dispersion information in this embodiment may be generated to induce return of as many shared vehicles as possible to the shared vehicle zone 32b that stores a minimum number of shared vehicles. As an example, the first dispersion information may have a movement location of the guide apparatus 20 which is to be matched to the doorway 12 corresponding to the minimum storage zone 32b. As another example, the first dispersion information may determine the movement location of the guide apparatus 20 to the minimum storage zone 32b, and at the same time may set another guide apparatus 20, which is already located at the maximum storage zone 32a, to stay without movement. As another example, the server 200 may set an expected number of passers-by at the minimum storage zone 32b to be larger than an expected number of passers-by at the maximum storage zone 32a, and the first dispersion information may be set so that openness at the guide apparatus 20 of the minimum storage zone 32b is larger than openness at the maximum storage zone 32a. Thus, the first dispersion information may include not only the movement location of the guide apparatus 20 but also openness that is set differently for each guide apparatus 20.

Next, based on the first dispersion information and the usage state information, the server 200 may generate return information, which requests return of a shared vehicle to be returned to the minimum storage zone 32b, and notify the return information to the user device 100 and/or the shared vehicle (S325).

Next, based on the first dispersion information, in order to induce the return of a shared vehicle to the minimum storage zone 32b, the server 200 may determine openness of the gate 24, while determining the movement location of the guide apparatus 20 to be a location of the doorway 12 that is matched to the minimum storage zone 32b (S330).

Next, based on the first dispersion information, in order to minimize passage to the maximum storage zone 32a, the server 200 may determine movement control of the guide apparatus 20 that is matched to the maximum storage zone 32a (S335). For example, based on the first dispersion information, the movement control may be determined to move and match the guide apparatus 20 to the maximum storage zone 32a or to maintain a location of the guide apparatus 20 that is already matched. In addition, the movement control may be determined so that the openness of the guide apparatus 20, either moved or maintained, is set based on first dispersion information.

Next, similarly to FIG. 6, the server 200 may move the guide apparatus 20 to the respective shared vehicle zones 32a and 32b and also control an opening operation of the gate 24. In addition, the server 200 may broadcast hub map information and transmit information on a moving route to the zone to the user device 100 which transmits mobility use information.

Meanwhile, when it is identified that there is one shared vehicle zone 32 (N of S310), the server 200 may notify return of a shared vehicle, which is to be returned, to the zone 32 (S340). In addition, the server 200 may analyze movement demand at the one shared vehicle zone 32 based on use information of shared vehicles, and in order to lead a user to the zone 32, may determine a movement location of the guide apparatus 20 and openness according to the movement demand.

According to this embodiment, as users are prevented from being concentrated in the shared vehicle zone 32*a*, in which a maximum number of shared vehicles are stored, a management system may reduce congestion of the particular shared vehicle zone 32*a* and also provide transit convenience.

FIG. 11 is a flowchart showing a process of guiding users using transit control of a guide apparatus based on a degree of congestion.

First, like in FIG. 6, the server 200 may receive user information from the user devices 100 and also information on an entry point leading to the affiliated zones 30 to 38 and a floating population of the hub platform 14 (S405).

For example, as exemplified in FIG. 4, the entry point may be the doorway 12 for moving to respective affiliated zones 30 to 38. The floating population information may be information associated with the number of a floating population in the affiliated zones 30 to 38 and the hub platform 14. Since the floating population at the hub platform 14 is estimated to be potential users who will move to the affiliated zones 30 to 38, the server 200 may refer to the floating population information in order to analyze movement demand.

Herein, the floating population of the affiliated zones 30 to 38 may be estimated in real time by using for example cameras installed at the doorway 12 or in the guide apparatus 20 or a people counting module that uses an iris scan sensor, an infrared sensor capable of sensing users who are passing a predetermined point and the like. The floating population of the hub platform 14 may be identified, for example, by the number of people who pass a ticket gate for getting on or off a first mobility. In addition, the floating population of the hub platform 14 may be calculated by using a camera installed at a point leading from the hub platform 14 to the transit hub 10 or a people counting module. Furthermore, floating population information may further include the number of people who are going to get on/off a first mobility that is expected to arrive at the transit hub 10. In this case, a user who is going to get on/off may be a person who uses a first mobility by designating the transit hub 10 as a departure point/destination.

Next, the server 200 may analyze movement demand of each of the affiliated zones 30 to 38 based on user information and also estimate a degree of congestion at the doorway 12 of each of the affiliated zones 30 to 38 based on the user information and floating population information (S410).

Next, the server 200 may check whether or not the degree of congestion of each doorway 12 is equal to or greater than a maximum congestion value set to each of the affiliated zones 30 to 38, and when there is a doorway 12 of which the degree of congestion is equal to or greater than the maximum congestion value, may generate second dispersion information (S415).

For example, the second dispersion information may include information on a detour route for moving to the mixed affiliated zones 30 to 38 through another doorway 12 having a predetermined degree of congestion near the doorway 12 having a degree of congestion equal to or greater than the maximum value. Specifically, in order to generate the second dispersion information, the server 200 may select the doorway 12 having a degree of congestion less than a threshold among other doorways 12 around a doorway having a degree of congestion equal to or greater than the maximum value (or congested doorway 12) and may determine a movement location of the guide apparatus 20 so as to correspond to the selected doorway 12. In case there are a plurality of selected doorways 12, the server 200 may finally select a detour doorway 12 based on, for example, a distance to the congested doorway 12, an expected number of passers-by dispersed from the congested doorway 12, a maximum congestion value of each doorway 12, and actual possibility of moving and actual distance between corresponding affiliated zones.

In addition, the server 200 may set the guide apparatus 20, which is matched to the congested doorway 12, to stay at a current position. In addition, the server 200 may allot an expected number of passers-by to be dispersed to the congested doorway 12 and the selected doorway 12 by considering the floating population and movement demand of the congested doorway 12 and may set gate openness in the guide apparatuses 20 corresponding to the congested doorway 12 and the selected doorway 12 respectively according to the allotted expected number of passers-by. For example, the expected number of people at the selected doorway 12 may be set to be larger than at the congested doorway 12, and the openness in the guide apparatus 20 of the selected doorway 12 may be set to be greater than the openness at the congested doorway 12.

Based on what is described above, the second dispersion information may be set to include detour entry information on a doorway 12, which is to detour near the congested doorway 12, a movement location and openness of the guide apparatuses 20 corresponding to the congested and selected doorways 12, and information on a detour route approaching a congested affiliated zone within the transit hub 10.

Next, based on the second dispersion information, the server 200 may determine a movement location and openness of the guide apparatuses 20 corresponding to the congested and selected doorways 12.

Next, the server 200 may move or maintain the guide apparatuses 20 according to the determined location and openness and may control the guide apparatuses 20 to open gates (S425).

Next, based on detour route information of the second dispersion information, the server 200 may reflect a detour route capable of moving the affiliated zones 30 to 38 to another doorway 12 different from the congested doorway 12 in indoor geography information of the transit hub 10 and may broadcast a hub map including the detour route to the user device 100 existing in the hub 10 (S430). Also, the server 200 may present the guide apparatus 20 for making a detour to approach the congested affiliated zones 30 to 38, the detour doorway 12 and a detour route to the affiliated zones 30 to 38 to a display unit of the guide apparatus 20 of which the operation is controlled. For example, in case the affiliated zones 30 to 38 associated with the congested doorway 12 are the shared mobility zones 30*a*, 30*b*, 32*a* and 32*b*, the server 200 may transmit individually detour route information to the user device 100 that makes a request to use a shared mobility.

In this embodiment, it is described that second dispersion information is generated based on information on a floating population at a doorway and user information and the operation of a guide apparatus is controlled based on the second dispersion information.

In another but similar embodiment, third dispersion information may be generated based on riding information associated with a mobility used by a user to arrive at a transit hub, and the operation of a guide apparatus may be controlled based on the riding information. In the description below, what is actually the same as FIG. 11 will be skipped, and brief explanations will be presented.

Specifically, like in FIG. 6, the server 200 may receive route information and mobility use request information from the user devices 100 and also receive riding information of a user for a mobility entering a transit hub from the user devices 100 and a mobility management server. Next, based on the above-described information, the server 200 may estimate a degree of congestion at the doorway 12 of each of the affiliated zones 30 to 38 by analyzing movement demand of each of the affiliated zones 30 to 38. Next, the server 200 may check whether or not the degree of congestion of each doorway 12 is equal to or greater than a maximum congestion value set to each of the affiliated zones 30 to 38, and when there is a doorway, of which the degree of congestion is equal to or greater than the maximum congestion value, may generate third dispersion information. For example, the third dispersion information may include information on a detour route for moving to the mixed affiliated zones 30 to 38 through another doorway having a predetermined degree of congestion near a doorway having a degree of congestion equal to or greater than the maximum value. In order to generate the third dispersion information, the server 200 may select the doorway 12 having a degree of congestion less than a threshold among other doorways 12 around a doorway having a degree of congestion equal to or greater than the maximum value (or congested doorway 12) and may determine a movement location of the guide apparatus 20 so as to correspond to the selected doorway 12. Next, based on the third dispersion information, the server 200 may determine the movement locations and openness of the guide apparatuses 20 corresponding to congested and selected doorways 12. Next, the server 200 may move or maintain the guide apparatuses 20 according to the determined locations and openness and may control the guide apparatuses 20 to open gates.

Figure 12:
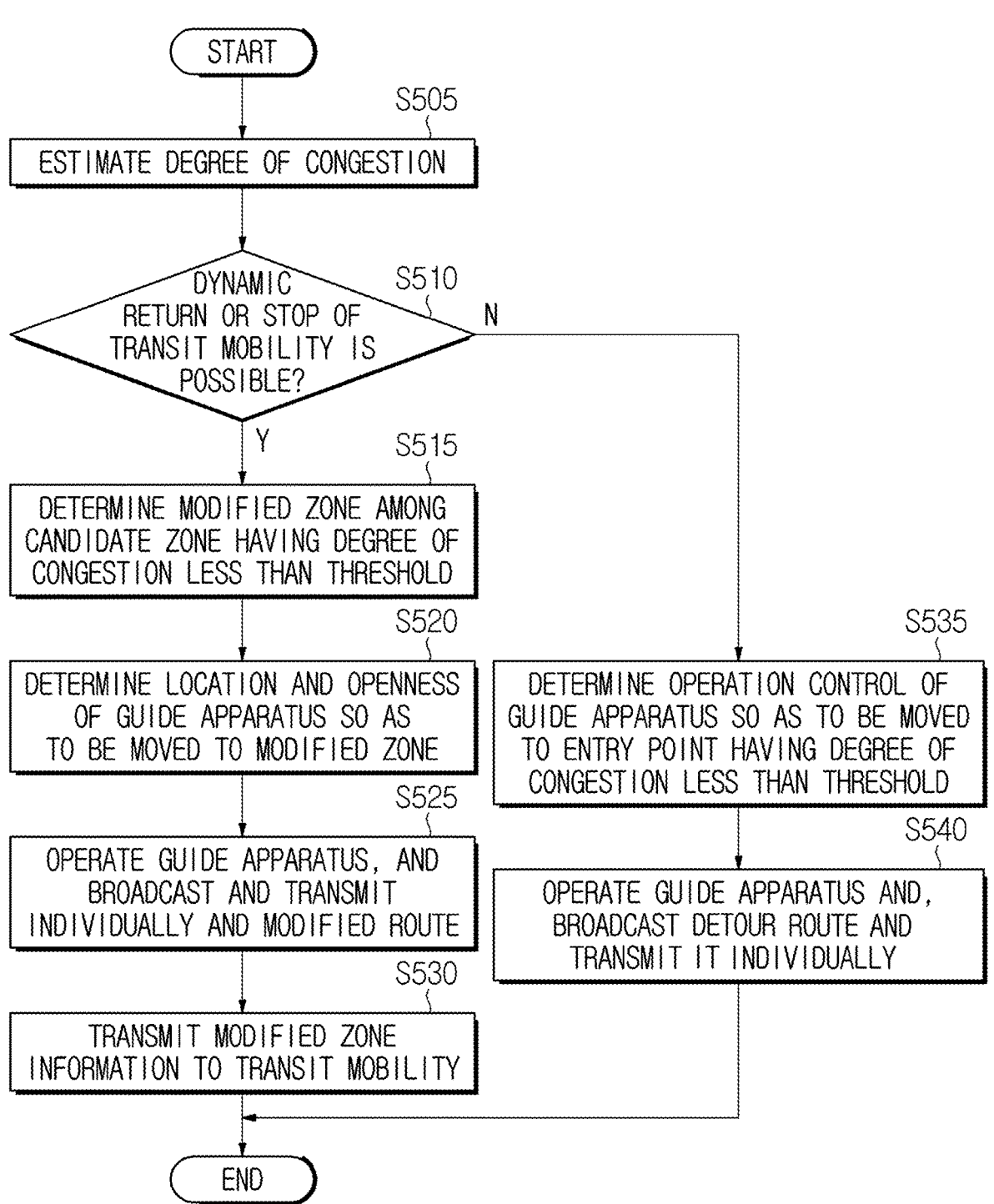
FIG. 12 is a flowchart showing a process of guiding a shared mobility and users based on a degree of congestion.

FIG. 12 is a flowchart showing a process of guiding a shared mobility and users based on a degree of congestion.

First, similarly to the steps S405 and 410 of FIG. 11, the server 200 may estimate a degree of congestion at an entry point, for example, at each doorway 12 leading to each of the affiliated zones 30 to 38 (S505).

Next, the server 200 may determine whether or not a degree of congestion at an entry point related to the transit mobility zones 30 to 36 is equal to or greater than a maximum congestion value that is set to each point, and when there is an entry point having a degree of congestion equal to or greater than the maximum congestion value, may identify whether or not a transit mobility related to the entry point is capable of dynamic return or stop (S510).

Describing with the example of FIG. 4, in case an entry point of the shared vehicle zones 32*a* and 32*b* has a degree of congestion that is equal to or greater than the maximum congestion value, the server 200 may check whether or not a shared vehicle to be returned in the transit hub 10 is capable of being returned not to the shared vehicle zones 32*a* and 32*b* but to any other affiliated zone. When providing a sharing service, the server 200 may check on its own whether or not dynamic return is permitted, and when the service is not provided, it is possible to ask the shared vehicle management server 200 whether or not dynamic return is permitted. For example, when a shared vehicle to be returned does not permit return to another zone because of a policy or at the request of a user who makes a reservation, dynamic return may not be permitted.

In case an entry point of an on-demand shuttle zone 36 has a degree of congestion that is equal to or greater than the maximum congestion value, the server 200 may check whether or not the on-demand shuttle, which is going to stop in the transit hub 10, is capable of stopping dynamically at any other affiliated zone than the shuttle zone 36.

In case a transit mobility is capable of dynamic return or stop, the server 200 may select a candidate zone having a degree of congestion less than a threshold other than a congested entry point and may determine a modified zone that will be utilized for dynamic return or stop (S515).

For example, the candidate zone may be selected among the affiliated zones 30 to 38 that correspond to an entry point having a degree of congestion less than a threshold among other entry points. Next, the server 200 may check, through an external system, information on congestion of the affiliated zones 30 to 38, which are selected as candidates, a zone agreed between the devices 100 of users of transit mobility reservation/return, an exceptional stop zone of transit mobility and the like. Based on the information thus checked, the server 200 may determine any one of the affiliated zones 30 to 38, which are candidate zones, as a modified zone and may designate an entry point of the transit hub 10 capable of leading to the modified zone.

Describing with example of a shared vehicle in FIG. 4, the server 200 may select two shared micro mobility zones 30*a* and 30*b* as candidate zones among the affiliated zones 30 to 38 that have a degree of congestion less than a threshold. Next, the server may determine one shared micro mobility zone 30*b* of the multiple zones 30*a* and 30*b* as a dynamic return zone, that is, a modified zone based on congestion of the zones 30*a* and 30*b*, which are selected as candidates, and a zone agreed by the devices 100 of users who make a reservation/return shared vehicles.

In the case of the on-demand shuttle zone 36, the server 200 may select two shared vehicle zones 32*a* and 32*b* as candidate zones having a degree of congestion less than a threshold. Next, the server may determine one shared vehicle zone 32*b* of the multiple zones 32*a* and 32*b* as a dynamic stop zone, that is, a modified zone by considering congestion of the affiliated zones 30 to 38, which are selected as candidates, and an exceptional stop zone of the on-demand shuttle.

Next, based on information associated with the modified zone, the server 200 may determine a movement location and openness of the guide apparatus 20 to an entry point that is capable of leading to the modified zone without detour (S520). Herein, the guide apparatus 20, which corresponds to the transit mobility zones 30 to 36 having a degree of congestion equal to or greater than the maximum congestion value, may be moved to another location or be maintained at a current location, when necessary. In addition, the guide apparatus 20, which is maintained at the current location, may be set to have smaller openness than a guide apparatus of the modified zone in order to prevent a user's confusion in using a transit mobility.

Next, the server 200 may move the guide apparatus 20 to be adjacent to an entry point of the modified zone according to the determined location and openness, and control to open the gate of the guide apparatus 20 (S525). Also, the server 200 may open the gate of the guide apparatus 20, which is maintained at the current location, according to the determined openness. In addition, the server 200 may reflect a modified route approaching a modified stop zone of a transit mobility in indoor geography information of the transit hub 10 based on the information associated with the modified zone and may broadcast a hub map including the modified route to the user device 100 which is present in the transit hub 10. Also, the server 200 may present the guide apparatus 20 for approaching the modified zone, the doorway 12 and the modified route to the modified zone on a display unit of the guide apparatus 20, of which the operation is controlled. For example, in case the modified zone is related to a shared mobility, the server 200 may transmit individually information on the modified route to the user device 100 making a request to use the shared mobility.

Meanwhile, in case dynamic return or stop of a transit mobility is not possible, the server 200 may determine the movement location and openness of the guide apparatus 20, which is matched to a detour entry point, so that a user of the transit mobility can move to the transit mobility zones 30 to 36 not through an entry point of the transit mobility zones 30 to 36 but by detouring through another entry point in a similar method to the steps S415 and S420 of FIG. 11 (S535). Like in the step S415 of FIG. 11, the detour entry point may be selected from multiple entry points that have a degree of congestion less than a threshold.

Next, similarly to the steps S425 and S430 of FIG. 11, the server 200 may move the guide apparatus 20 to the detour entry point, for example, the detour doorway 12, control to open the gate according to the determined location and openness, and broadcast or transmit individually information on the detour route to the user device 100.

According to the steps S505 to S530 of this embodiment, by locating the guide apparatus 20 so as to go straight to a modified zone, as the return or stop zone of a transit mobility is modified according to degree of congestion, a user of the transit mobility may move to a transit zone more quickly than the steps S535 and S540, which move to a detour route, and congestion may also be significantly reduced due to dispersion of movement demand.

Figure 13:
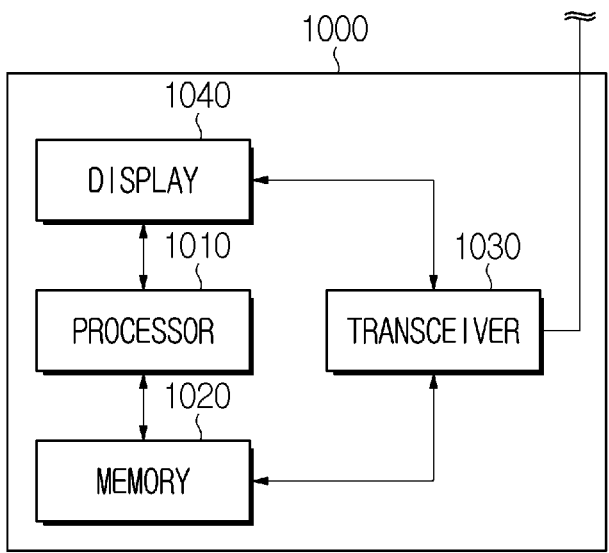
FIG. 13 is a view illustrating a device configuration according to an embodiment of the present disclosure.

FIG. 13 is a view illustrating a device configuration according to an embodiment of the present disclosure. Referring to FIG. 13, the device may include at least one or more among the above-described mobility, a device, a server and an RSU. In other words, the device may communicate and work with another device, which is not limited to the above-described embodiment. As an example, for the above-described operation, a device 1000 may include one or more among a processor 1110, a memory 1120, a transceiver 1130 and a display 1040. That is, the device may include a configuration necessary to communicate with another device or may display a data processing result between each other. In addition, as an example, the device may include other configurations than the above-described configuration. That is, the device may have a configuration, which includes the above-described device for communicating with another device but is not limited thereto, and may be a device operating based on what is described above.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for guiding a user in a mobility transit hub implemented by a computing device, the method comprising:

obtaining user information that comprises at least one of route information of the user using the mobility transit hub and mobility use information associated with a mobility requested by the user;

analyzing, based on the user information, movement demand of the user who moves to an affiliated zone connected with the transit hub, wherein the analyzing of the movement demand analyzes the movement demand by identifying a frequency of use of each zone, when the affiliated zone comprises a plurality of shared mobility zones of a same type;

controlling an operation of a guide apparatus that controls a passage number of the user, in order to lead the user to the affiliated zone that is determined based on the movement demand, wherein the guide apparatus is installed on a track, wherein the guide apparatus is a structure configured to block boarding and is separated from the mobility, wherein the guide apparatus includes a gate that varies according to the movement demand, wherein the gate is controlled for the passage number of the user by adjusting an openness of the gate, wherein an amount of the openness of the gate is determined based on the movement demand, wherein the guide apparatus is controlled to move within a mobility transit hub area by the track to guide the user to get on and off the mobility based on a degree of congestion at an entry point for the affiliated zone, wherein the controlling of the operation of the guide apparatus controls the operation of the guide apparatus in order to lead first to the shared mobility zone having a high frequency of use, wherein the mobility use information further comprises return information that requests to return the shared mobility to the transit hub;

generating the return information, which requests to return the shared mobility first to the shared mobility zone having the high frequency of use; and transmitting the return information to a user device.

2. The method of claim 1, wherein the affiliated zone comprises a mobility transit zone, which is provided around the transit hub, and a facility zone.

3. The method of claim 2, wherein the mobility transit zone comprises at least one of a shared mobility zone, a regular route moving object zone, and an on-demand shuttle zone.

4. The method of claim 1, wherein the controlling of the operation of the guide apparatus controls the operation of the guide apparatus to the affiliated zone that corresponds to movement demand related to the use request, when the mobility use information comprises a use request for a transit mobility, which is made by a user device and the affiliated zone is a mobility transit zone.

5. The method of claim 1, wherein the analyzing of the movement demand searches the transit mobility based on the information on a location point and analyzes movement demand associated with the searched transit mobility, when the route information comprises information on a location point, which is reachable by using a transit mobility provided in the transit hub.

6. The method of claim 1, wherein the controlling of the operation of the guide apparatus controls an operation of each of the guide apparatuses to guide the user to a plurality of affiliated zones that are determined based on the movement demand, when there are a plurality of the guide apparatuses.

7. The method of claim 1, wherein, when the affiliated zone comprises a plurality of shared mobility zones of a same type, the analyzing of the movement demand comprises:

checking use status information of a shared mobility according to each zone; and generating first dispersion information for dispersing the user according to each shared mobility zone based on the use status information and the movement demand, wherein the controlling of the operation of the guide apparatus comprises controlling the operation of the guide apparatus based on the first dispersion information, and wherein the use status information is generated based on retention information of the shared mobility in the zone and reservation and return information of the shared mobility in the zone.

8. The method of claim 7, wherein the mobility use information further comprises return information that requests to return the shared mobility to the transit hub, and the method further comprising:

generating the return information, which requests to return the shared mobility first to the shared mobility zone based on the first dispersion information; and transmitting the return information to a user device.

9. The method of claim 1, wherein the user information further comprises history information that stores cumulatively data associated with a transit mobility that is already used in the transit hub, and wherein the analyzing of the movement demand analyzes the movement demand for the affiliated zone associated with the transit mobility that is already used.

10. The method of claim 1, further comprising:

after the controlling of the operation of the guide apparatus, generating information on a moving route entering the affiliated zone, which is designated according to the user information, via the guide apparatus and transmitting the information on the moving route to each user device; and broadcasting a location of the affiliated zone and a location of the guide apparatus, which corresponds to the affiliated zone, to the user.

11. The method of claim 1, wherein the analyzing of the movement demand further comprises:

estimating the degree of congestion of an entry point for the affiliated zone based on floating population information at the entry point of the transit hub for moving to the affiliated zone and the user information; and generating second dispersion information for dispersing the user to the entry point below a threshold based on the degree of congestion, and wherein the controlling of the operation of the guide apparatus controls the operation of the guide apparatus based on the second dispersion information.

12. The method of claim 11, wherein the controlling of the operation of the guide apparatus controls the guide apparatus so that entry points having different degrees of congestion have different numbers of users passing by based on the second dispersion information.

13. The method of claim 1, wherein the mobility use information further comprises riding information associated with a mobility used by the user, wherein the analyzing of the movement demand further comprises:

estimating the degree of congestion of an entry point for the affiliated zone based on the route information and the riding information; and generating third dispersion information for dispersing the user to the entry point below a threshold based on the degree of congestion, and wherein the controlling of the operation of the guide apparatus controls the operation of the guide apparatus based on the third dispersion information.

14. The method of claim 1, wherein the analyzing of the movement demand further comprises:

estimating the degree of congestion of an entry point for the affiliated zone based on floating population information at the entry point of the transit hub for moving to the affiliated zone and the user information; and generating modified zone information associated with the entry point below a threshold based on the degree of congestion, when the transit mobility is capable of stopping at a zone modified from a pre-designated affiliated zone, and wherein the controlling of the operation of the guide apparatus controls the operation of the guide apparatus based on the modified zone information.

15. The method of claim 1, wherein the guide apparatus is configured to:

move along the affiliated zone in the transit hub, and control a number of users who move to the affiliated zone.

16. A server for guiding a user in a mobility transit hub, the server comprising:

a transceiver configured to transmit and receive a signal; and a processor configured to control the transceiver, wherein the processor is further configured to:

obtain user information that comprises at least one of route information of the user using the mobility transit hub and mobility use information associated with a mobility requested by the user;

analyze, based on the user information, movement demand of the user who moves to an affiliated zone connected with the transit hub, wherein analyzing of the movement demand analyzes the movement demand by identifying a frequency of use of each zone, when the affiliated zone comprises a plurality of shared mobility zones of a same type; and control an operation of a guide apparatus that controls a passage number of the user, in order to lead the user to the affiliated zone that is determined based on the movement demand, wherein the guide apparatus is installed on a track, wherein the guide apparatus is a structure configured to block boarding and is separated from the mobility, wherein the guide apparatus includes a gate that varies according to the movement demand, wherein the gate is controlled for the passage number of the user by adjusting openness of the gate, wherein an amount of openness of the gate is determined based on the movement demand, wherein the guide apparatus is controlled to move within a mobility transit hub area by the track to guide the user to get on and off the mobility based on a degree of congestion at an entry point for the affiliated zone, wherein controlling the operation of the guide apparatus controls the operation of the guide apparatus in order to lead first to the shared mobility zone having a high frequency of use, and wherein the mobility use information further comprises return information that requests to return the shared mobility to the transit hub;

generate the return information, which requests to return the shared mobility first to the shared mobility zone having the high frequency of use; and transmit the return information to a user device.

17. The server of claim 16, wherein the controlling of the operation of the guide apparatus controls the operation of the guide apparatus to guide the user to the affiliated zone that corresponds to movement demand related to the use request, when the mobility use information comprises a use request for a transit mobility, which is made by a user device and the affiliated zone is a mobility transit zone.

18. A management system implemented by a computing device and capable of executing a user guide process in a mobility transit hub, the management system comprising:

a server configured to operate the management system;

at least one user device registered to the management system; and at least one mobility registered to the management system, wherein the server is configured to:

obtain user information that comprises at least one of route information of a user using the mobility transit hub and mobility use information associated with a mobility requested by the user;

analyze, based on the user information, movement demand of the user who moves to an affiliated zone connected with the transit hub, wherein the analyzing of the movement demand analyzes the movement demand by identifying a frequency of use of each zone, when the affiliated zone comprises a plurality of shared mobility zones of a same type;

control an operation of a guide apparatus that controls a passage number of the user, in order to lead the user to the affiliated zone that is determined based on the movement demand, wherein the guide apparatus is installed on a track, wherein the guide apparatus is a structure configured to block boarding and is separated from the mobility, wherein the guide apparatus includes a gate that varies according to the movement demand, wherein the gate is controlled for the passage number of the user by adjusting openness of the gate, wherein an amount of the openness of the gate is determined based on the movement demand, wherein the guide apparatus is controlled to move within a mobility transit hub area by the track to guide the user to get on and off the mobility based on a degree of congestion at an entry point for the affiliated zone, wherein the controlling of the operation of the guide apparatus controls the operation of the guide apparatus in order to lead first to the shared mobility zone having a high frequency of use, and wherein the mobility use information further comprises return information that requests to return the shared mobility to the transit hub;

generate the return information, which requests to return the shared mobility first to the shared mobility zone having the high frequency of use; and transmit the return information to a user device.

\* \* \* \* \*